Oct. 26, 1965 R. G. SPEAR 3,214,232
PANORAMIC PICTURE CAMERA
Filed Nov. 14, 1960 17 Sheets-Sheet 1

INVENTOR.
REGINALD G. SPEAR
BY
Christie, Parker & Hale
ATTORNEYS.

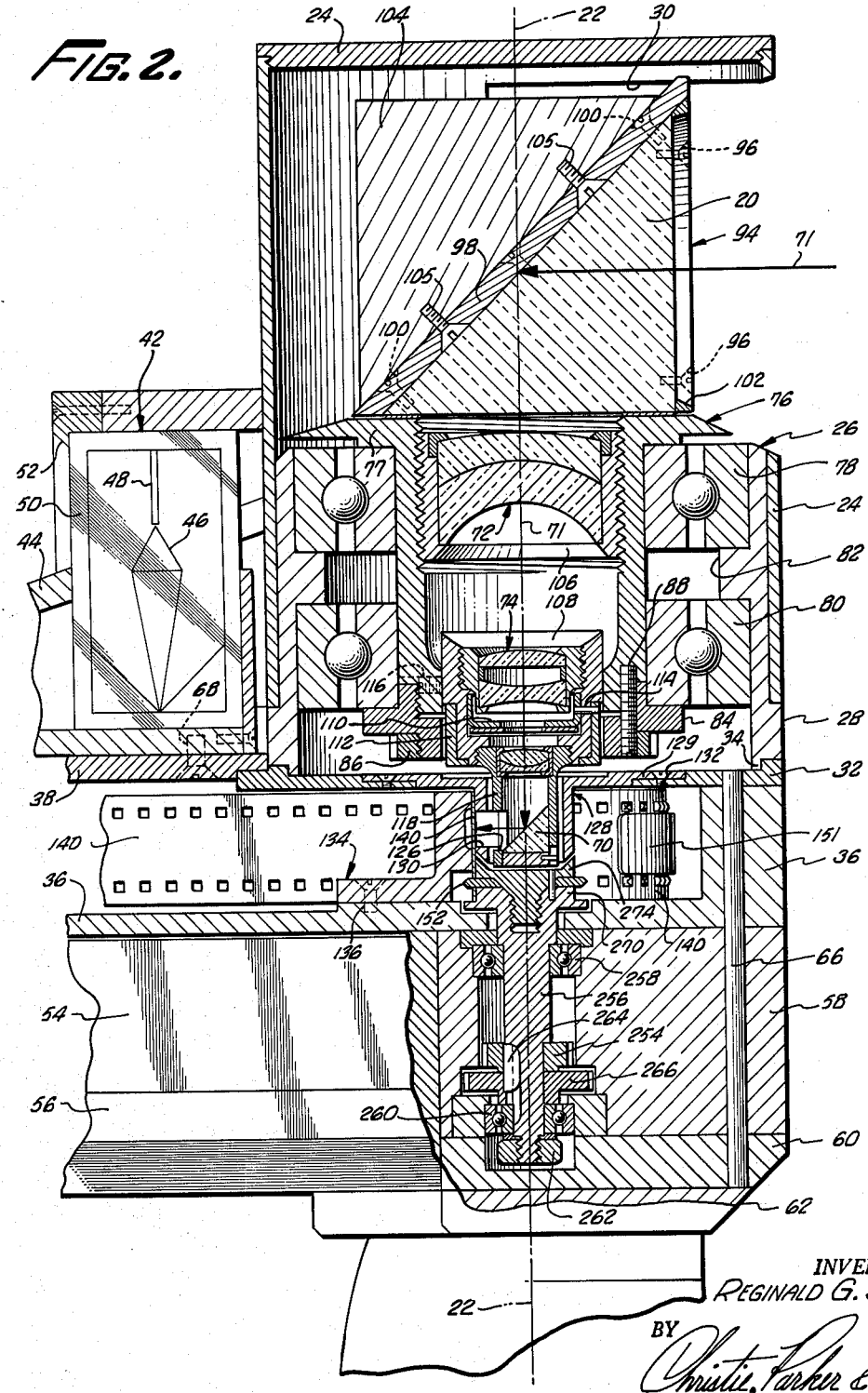

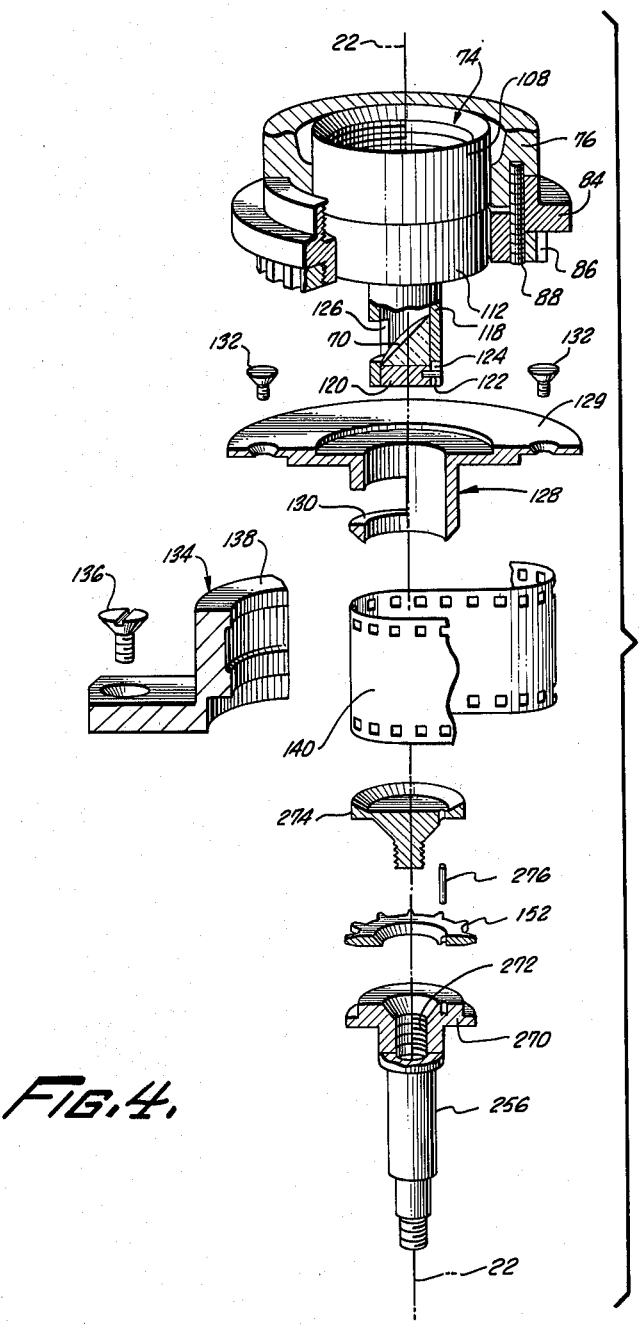

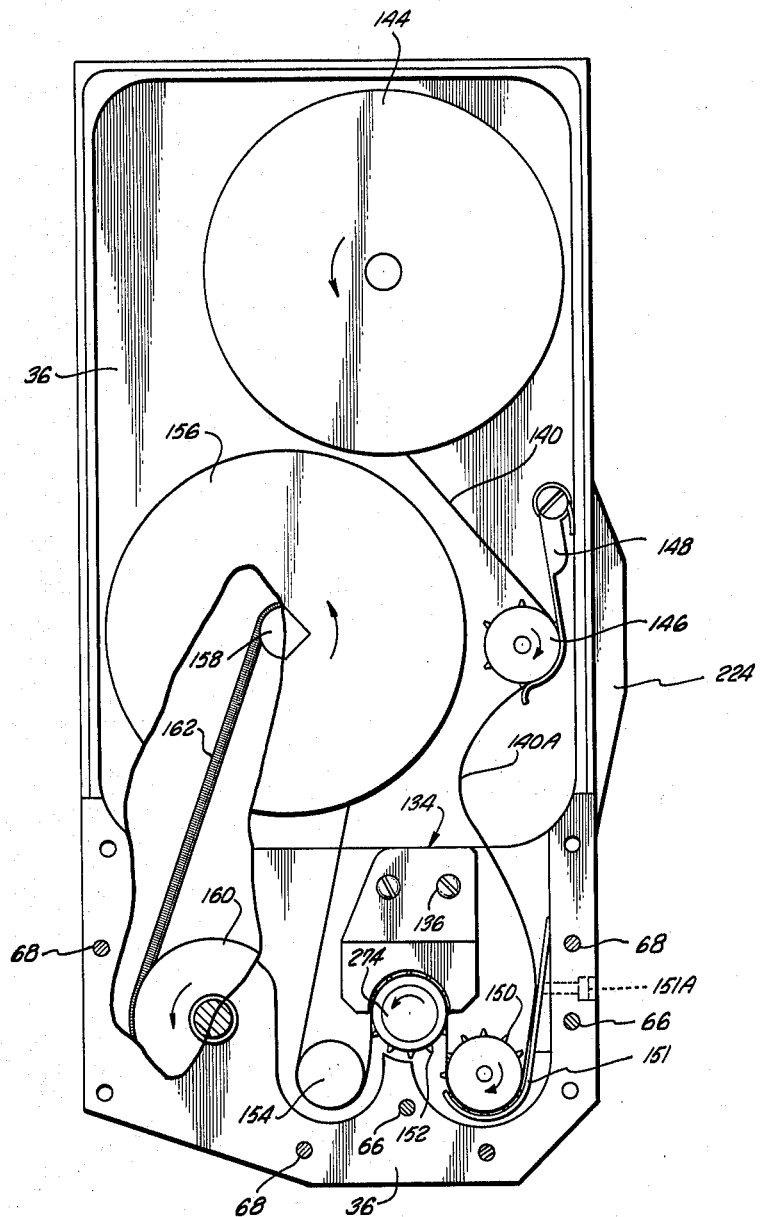

INVENTOR.
REGINALD G. SPEAR
BY
Christie, Parker & Hale
ATTORNEYS.

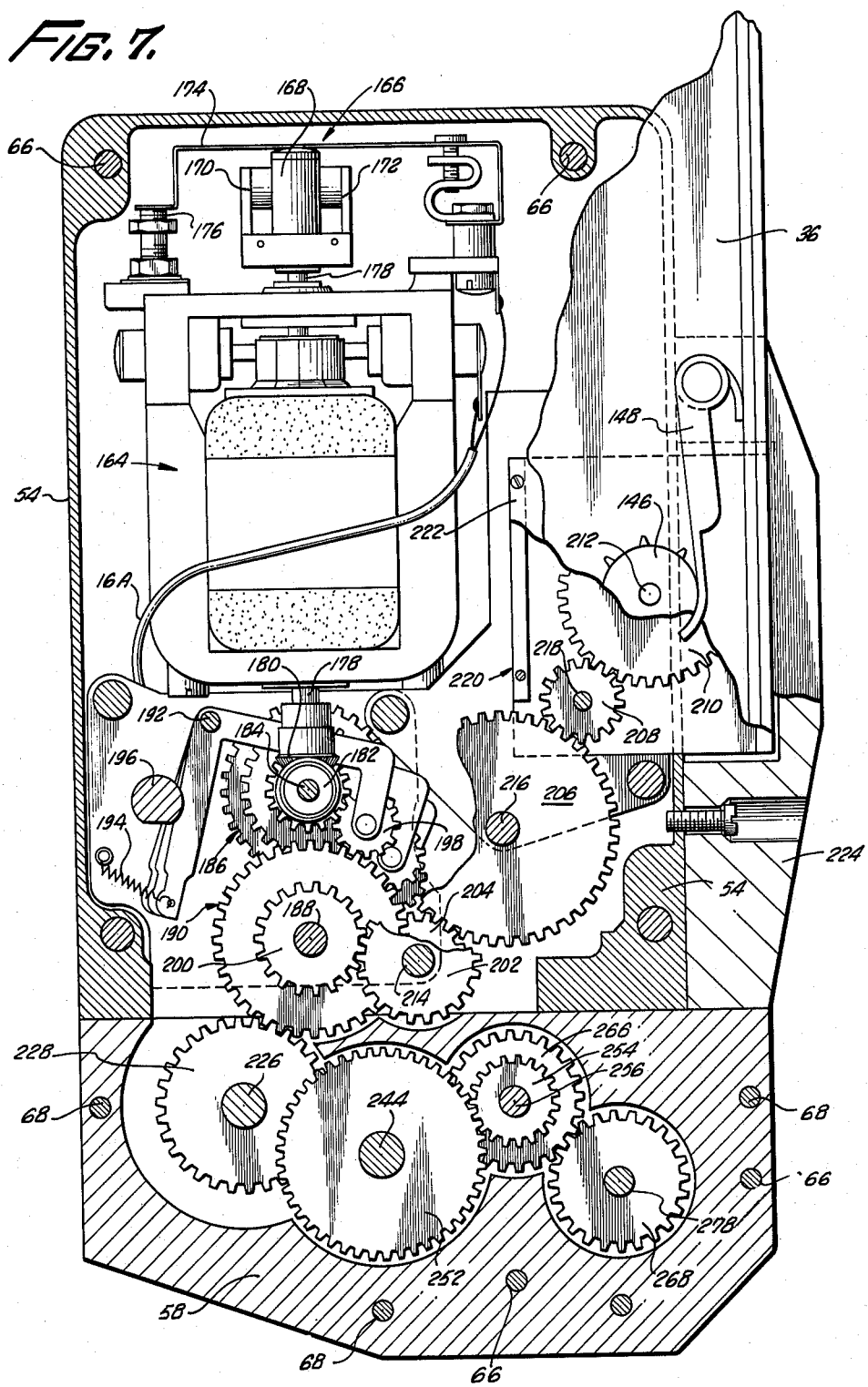

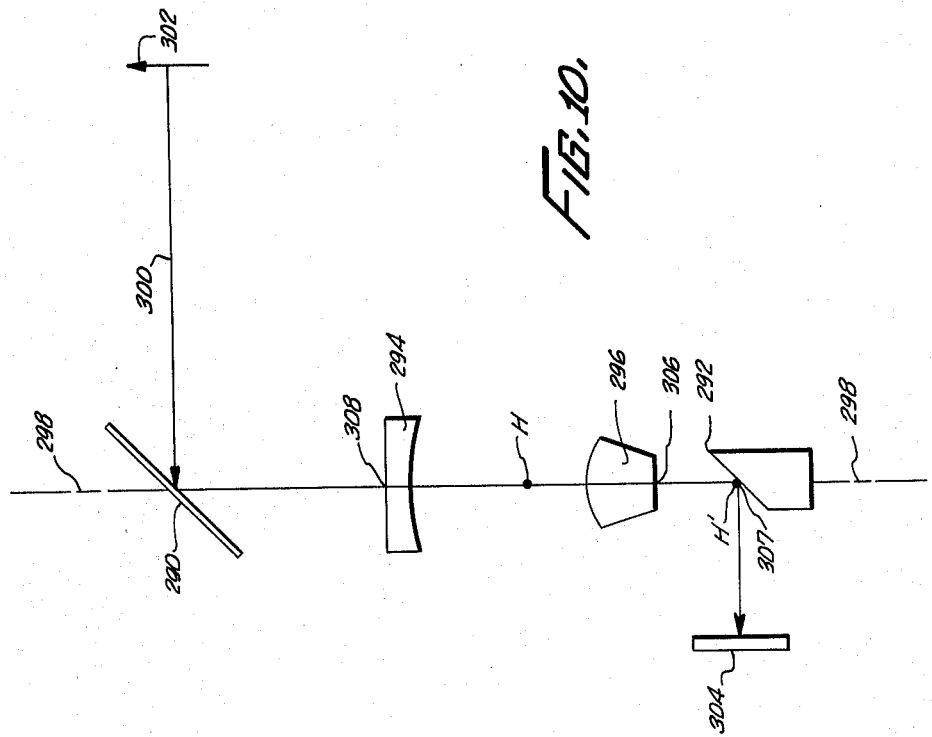
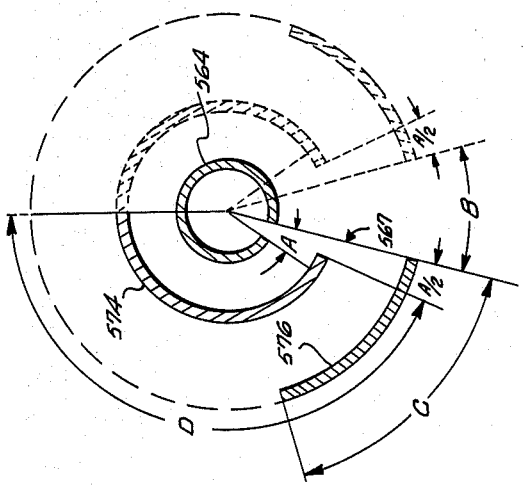

Oct. 26, 1965   R. G. SPEAR   3,214,232
PANORAMIC PICTURE CAMERA
Filed Nov. 14, 1960   17 Sheets-Sheet 8

INVENTOR.
REGINALD G. SPEAR
BY
Christie, Parker & Hale
ATTORNEYS.

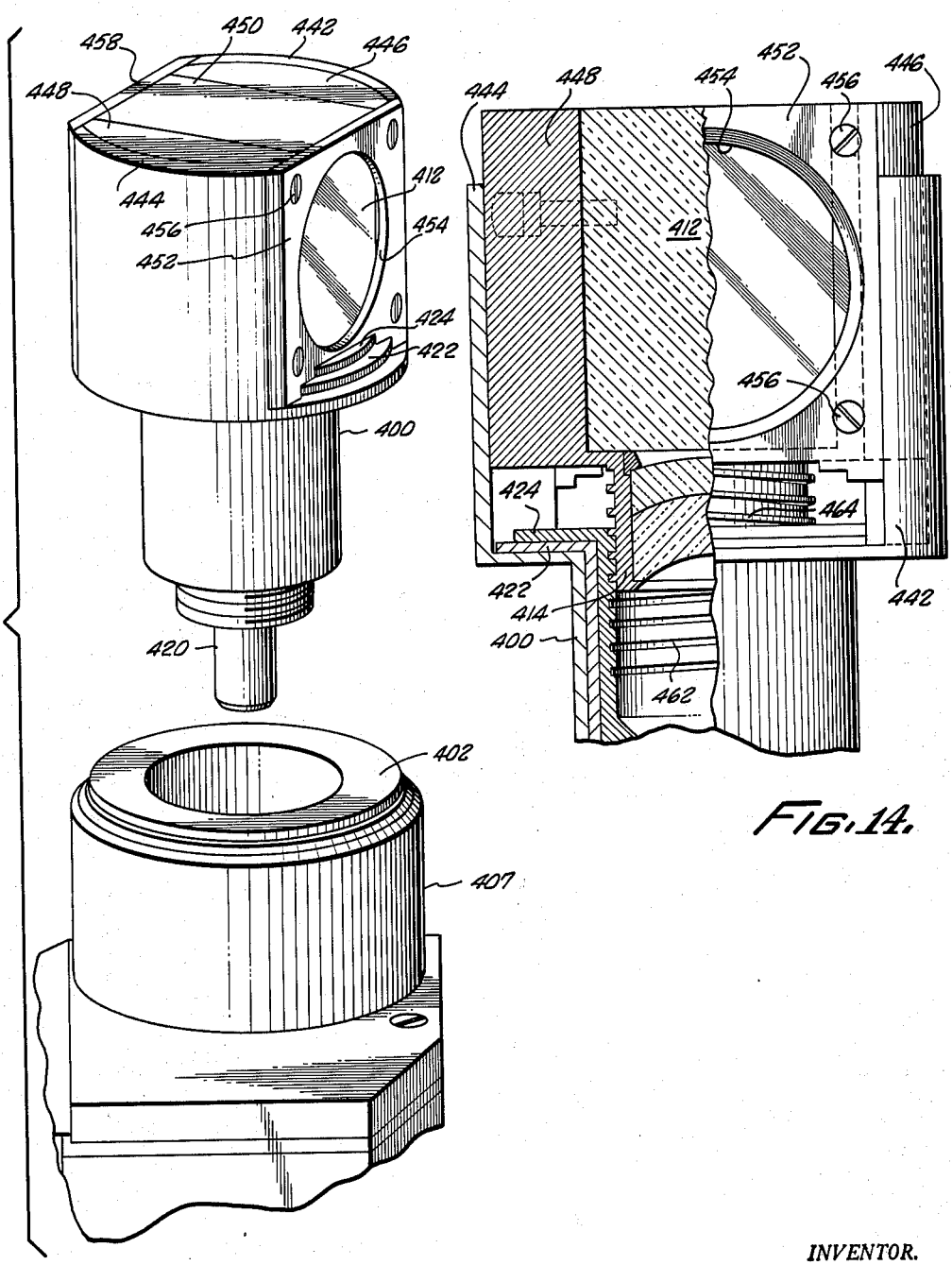

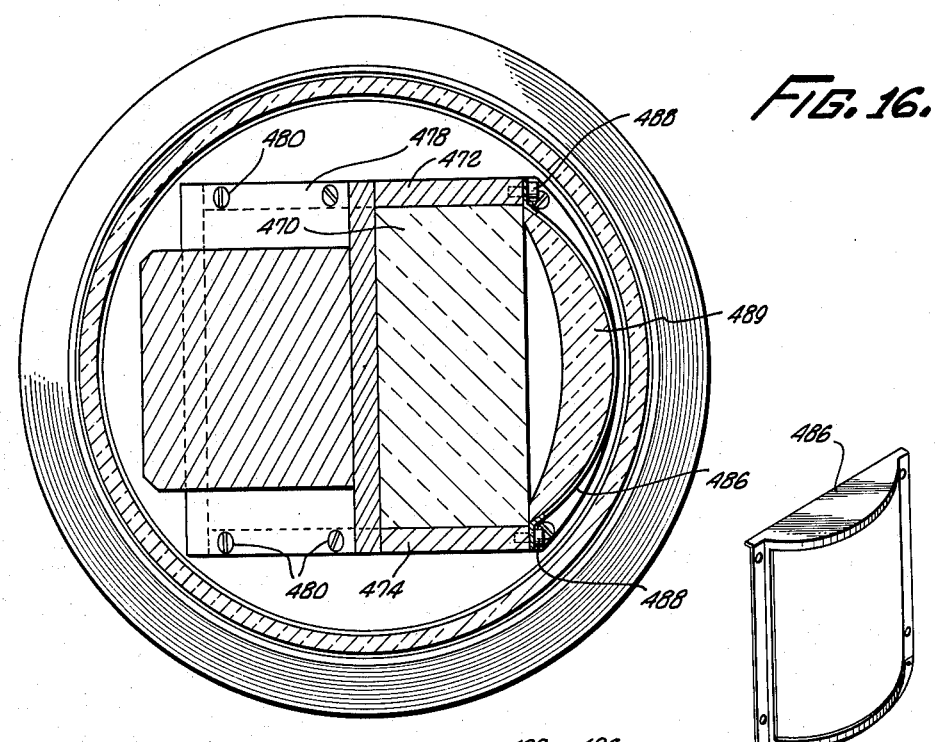
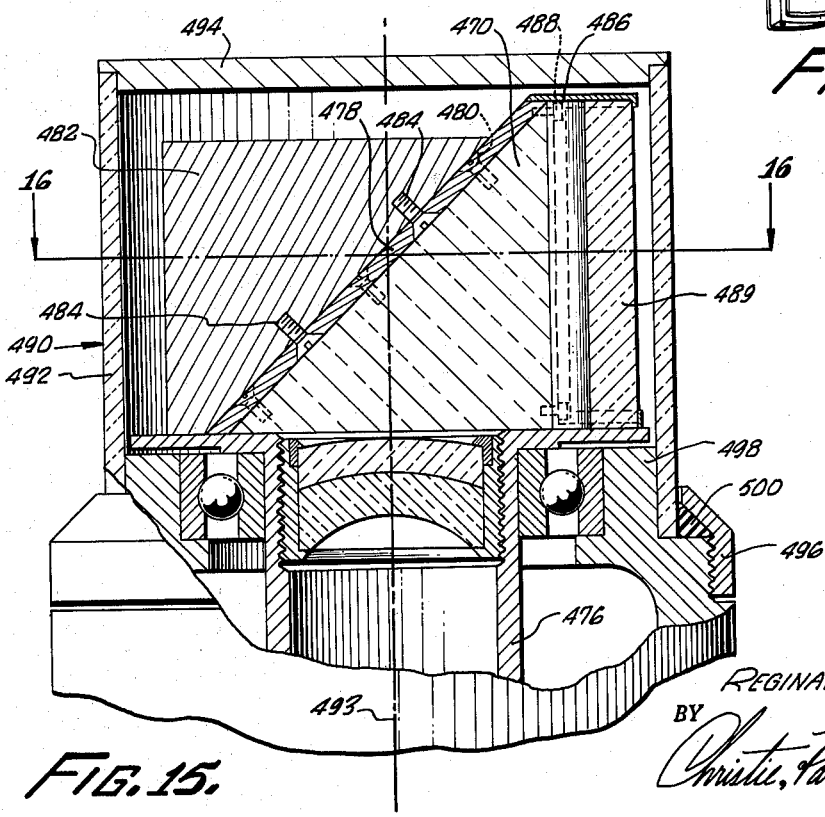

Oct. 26, 1965  R. G. SPEAR  3,214,232
PANORAMIC PICTURE CAMERA
Filed Nov. 14, 1960  17 Sheets-Sheet 11
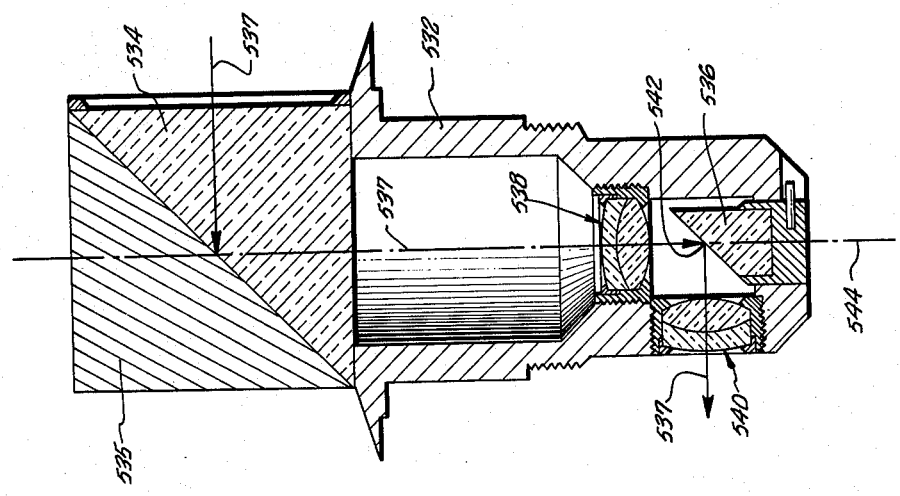
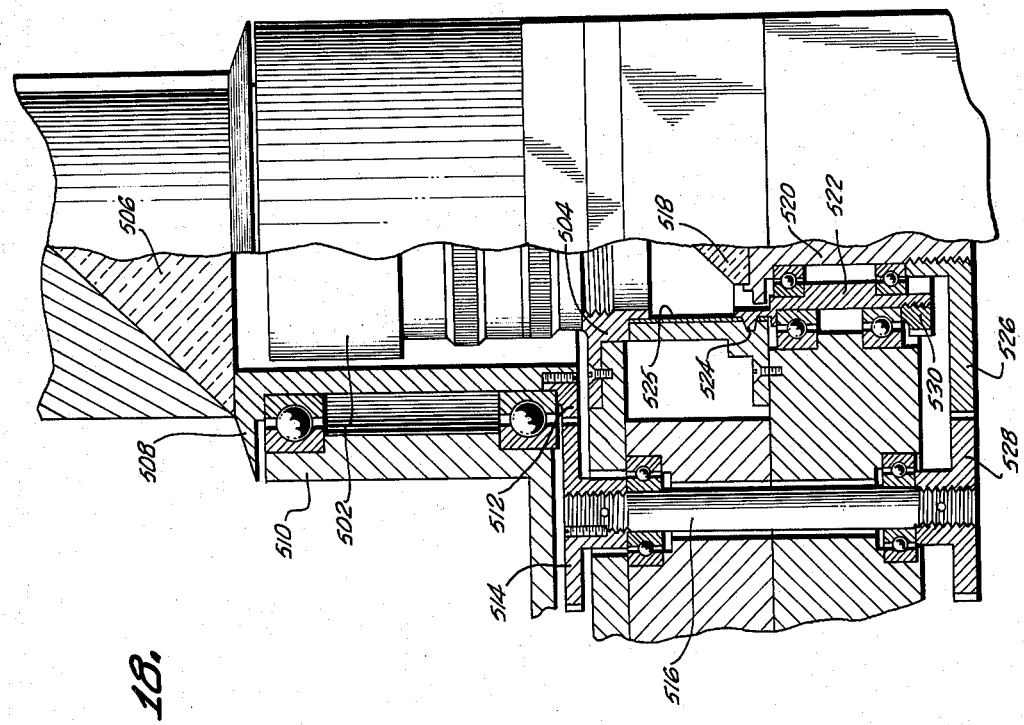
INVENTOR
REGINALD G. SPEAR
BY
ATTORNEYS.

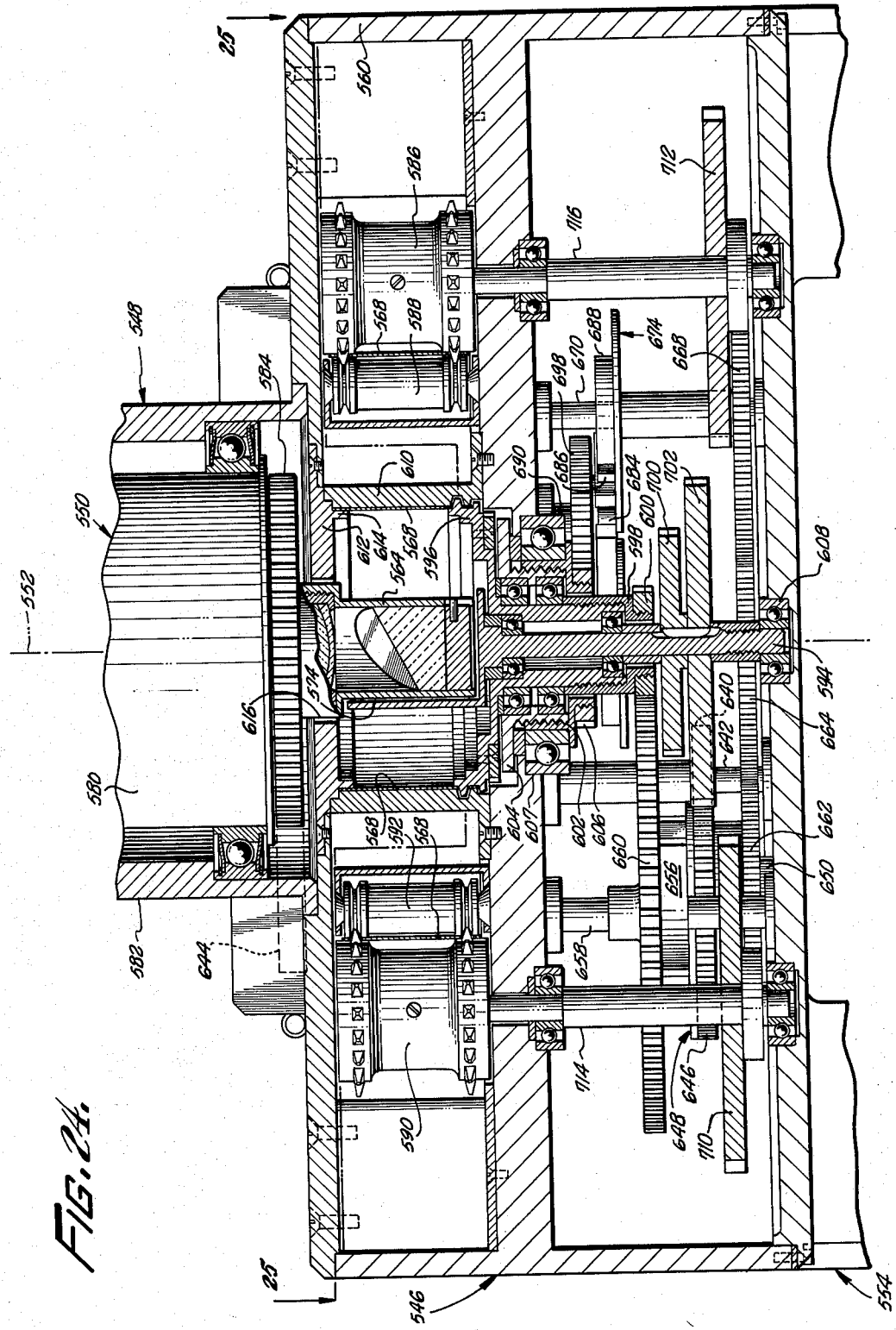

Oct. 26, 1965  R. G. SPEAR  3,214,232
PANORAMIC PICTURE CAMERA
Filed Nov. 14, 1960  17 Sheets-Sheet 15
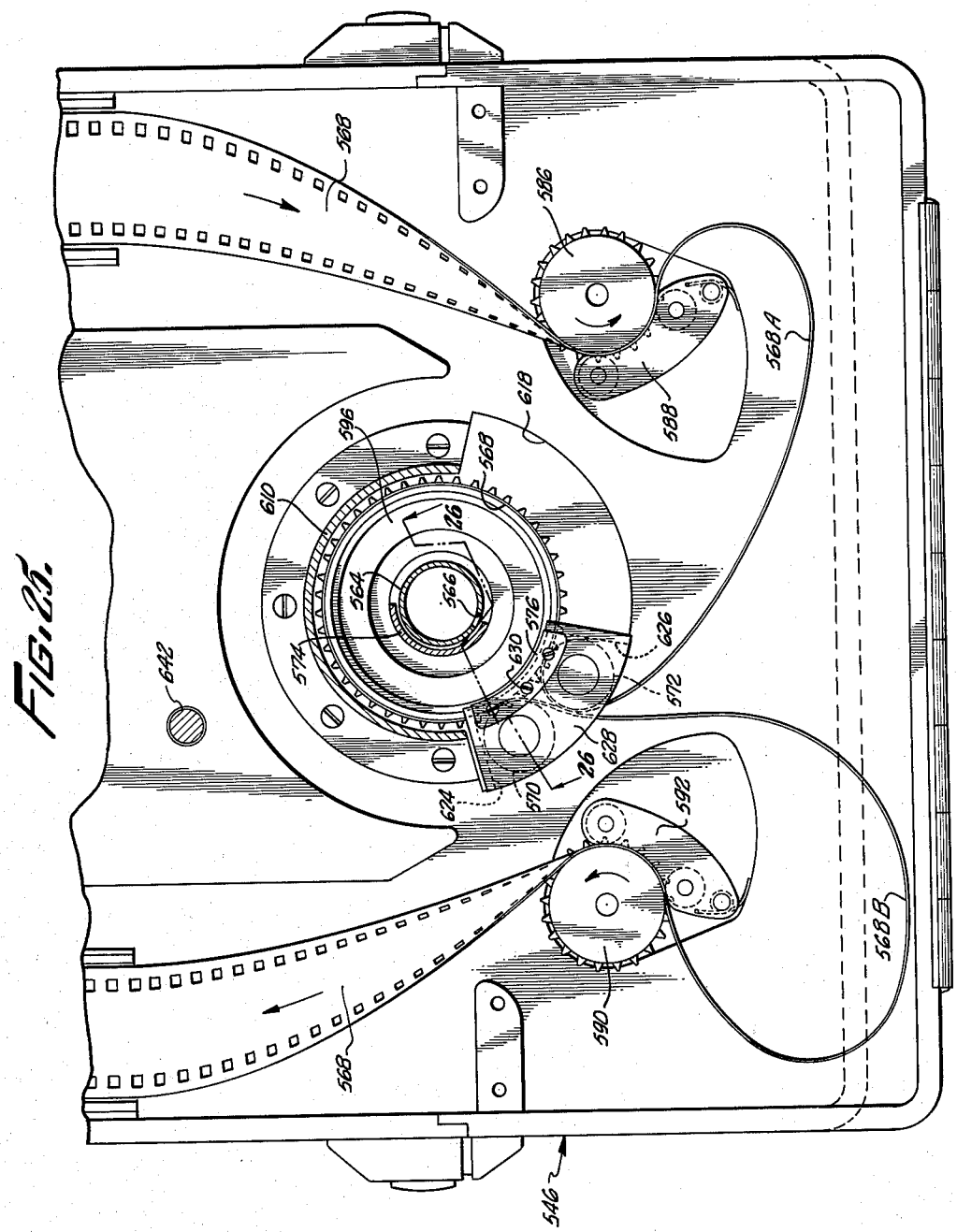
INVENTOR.
REGINALD G. SPEAR
BY
Christie, Parker & Hale
ATTORNEYS.

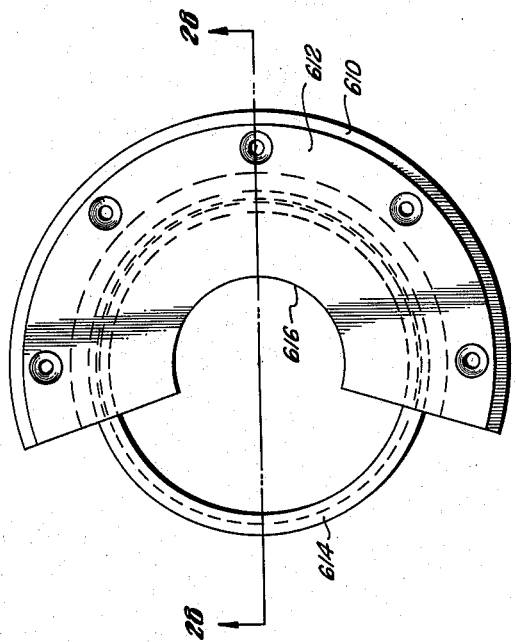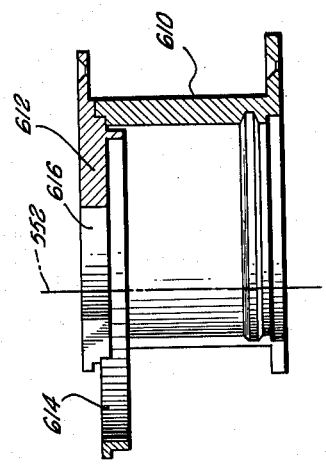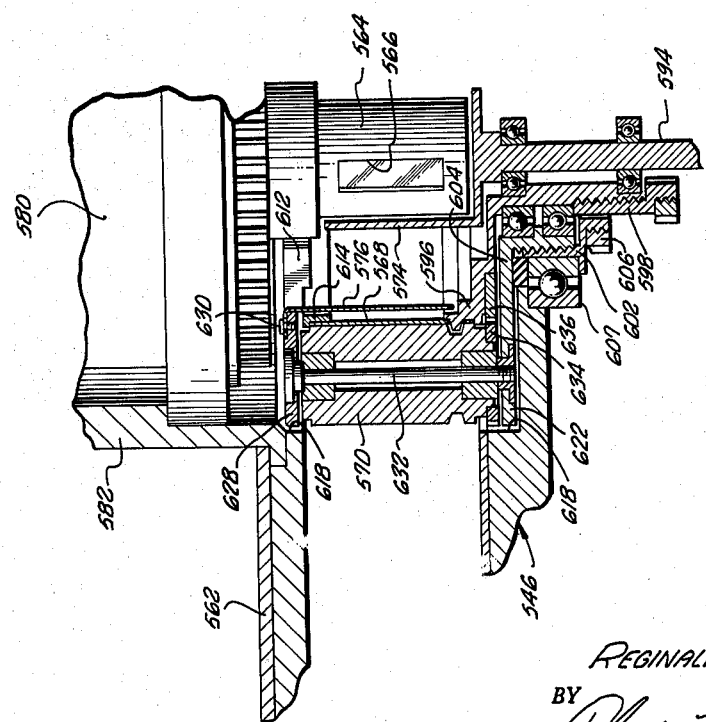

Oct. 26, 1965 R. G. SPEAR 3,214,232
PANORAMIC PICTURE CAMERA
Filed Nov. 14, 1960 17 Sheets-Sheet 17

INVENTOR.
REGINALD G. SPEAR
BY
Christie, Parker & Hale
ATTORNEYS.

United States Patent Office 3,214,232
Patented Oct. 26, 1965

3,214,232
PANORAMIC PICTURE CAMERA
Reginald G. Spear, 1434 Park Place, San Marino, Calif.
Filed Nov. 14, 1960, Ser. No. 69,105
31 Claims. (Cl. 352—69)

This invention relates to cameras for photographing panoramic pictures, especially motion pictures wherein each frame is to include an extraordinary wide view of the lateral surroundings, say about 180°, or 360° or more (meaning an overlap within each frame).

The attempt to provide a satisfactory panoramic motion picture camera has been in progress for many years. Typical of many devices proposed for solving this problem are those described and shown in the recent patent to Keeble, U.S. Patent No. 2,926,561, dated Mar. 1, 1960 and the recent patent to Bouwers, U.S. Patent No. 2,923,220, dated Feb. 2, 1960.

Without attempting to analyze specifically either of the patented devices referred to above, suffice it to so say generally that panoramic motion picture cameras have been fraught with practical problems, usually involving a combination of several of the following: The length of film required for each frame is excessive because the film must extend around the main lenses; the optical system required is unduly complicated and expensive; the horizontal angular distance encompassed by the camera for each frame is limited to something less than 180°; the vertical angle encompassed by the lens system is very small; the camera design precludes any reasonable means for focusing the camera for different object distances; the space available for the optical system or the peculiar nature of the optical system required detracts from image quality and/or field of view of the lens at any given position; the mechanical arrangement for introducing successive new frames to the camera is unreliable at motion picture speeds because the frames are longer and the time for changing frames is shorter than in conventional type motion picture cameras and because of physical limitations in the strength of motion picture film; and, a host of other problems such as inordinate size, lack of versatility, and inability to adapt in simplified versions for general public use. These difficulties are not easily overcome, because the solution to one often defeats any solution to another or introduces new serious problems.

With the present invention a new approach is taken to the design of a panoramic motion picture camera wherein, due to the unique combination of structure involved, the foregoing problems are substantially eliminated to a greater degree than ever before.

The structural combination of the present invention, as a part of a camera for photographing panoramic pictures, includes an upper reflector supported in an inclined position on a vertical axis for intercepting light from the surrounding area and reflecting the same downwardly, a lower reflector supported in an inclined position on the same axis for intercepting the reflected light from the upper reflector and reflecting the same in a lateral direction, means defining a curved film gate adjacent the lower reflector for supporting a film strip in a position to receive light reflected laterally from the lower reflector, a lens system supported in alignment with the light path in the camera and having its focal plane located outward from the lower reflector at the same distance as the film gate, means for introducing successive unexposed film strip portions to said film gate, and means for rotating said reflectors in unison about said axis so as to pan a wide view around the film gate.

In one embodiment of the invention, the upper reflector is in the form of a relatively large reflecting prism, and the lower reflector is in the form of a relatively small first surface mirror, with the reflecting surfaces of the mirror and prism being parallel and inclined on the vertical axis at 45°. The film gate is cylindrically curved about the vertical axis. The lens system includes a plurality of lenses supported between the upper and lower reflectors on a common optical axis which coincides with the vertical axis. A supporting means supports the reflectors and lenses for rotation in unison about the vertical axis. The supporting means includes a sleeve support, means mounting the reflectors and lenses coaxially on the sleeve support, and means rotatably mounting the sleeve support axially on the vertical axis. The means mounting the lower reflector on the sleeve support includes an enclosure depending coaxially from the sleeve support and disposed centrally within the gate. This depending enclosure has a side opening therein, the horizontal angular width of which is a small fractional part of that of the film gate. The lower reflector is mounted in the enclosure in optical alignment with the opening. Means are provided for rotating the sleeve support, hence the lenses and reflectors, about the vertical axis so as to repeatedly pan a wide view around the full extent of the film gate. Cooperating means are synchronized with the rotation of said sleeve support for introducing successive unexposed film portions to the gate after each succeeding one is exposed, whereby successive panoramic picture frames are produced.

The means for introducing successive unexposed film portions comprises means for periodically shielding the light from the film in the gate as the reflectors rotate, and film advancing means for introducing successive unexposed film strip portions to the film gate concurrent with the periods when the light is shielded. The film advancing means includes a sprocket wheel supported coaxially on the vertical axis in a position immediately below the lower reflector for engaging the film strip portion in the gate, and means synchronized with the rotation of the reflectors for driving the sprocket wheel intermittently at periods corresponding to the shielding of the light. The effective root radius of the sprocket wheel is equal to the radius of the gate.

The foregoing structure lends itself well to the inclusion therewith of cooperating means for focusing the lens system for different object distances while maintaining the focal plane location constant. For example, in one embodiment of the invention, the means rotatably mounting the sleeve support on the vertical axis includes an outer sleeve, means rotatably mounting the outer sleeve on the vertical axis, and means mounting the sleeve support coaxially in the outer sleeve so that its angular postion therein is adjustable. The sleeve support has upper and lower internally threaded portions. The means mounting the lenses on the sleeve support includes an upper lens housing and a lower lens housing each having exterior threads mating respectively with the upper and lower threaded portions of the sleeve support, and means for restricting movement of the lens housings relative to the outer sleeve to longitudinal movement along the vertical axis. With this arrangement, adjustment of the sleeve support within the outer sleeve focuses the camera by adjusting the vertical position of the upper and lower lens housings simultaneously in accordance with the direction and rates of the respective upper and lower threads in the sleeve support.

The foregoing and other improvements in panoramic cameras within the scope of the invention will be better understood by reference to the following detailed description taken in conjunction with the accompanying drawings wherein several embodiments thereof are illustrated, and in which:

FIG. 2 is a fragmentary sectional elevation taken along line 2—2 of FIG. 1;

FIG. 4 is an exploded fragmentary perspective, partly in section, of parts of the camera of FIG. 1 which lie adjacent the film gate in the camera;

FIG. 5 is a plan view, partially cut away, taken along line 5—5 of FIG. 1;

Figures 1, 3:
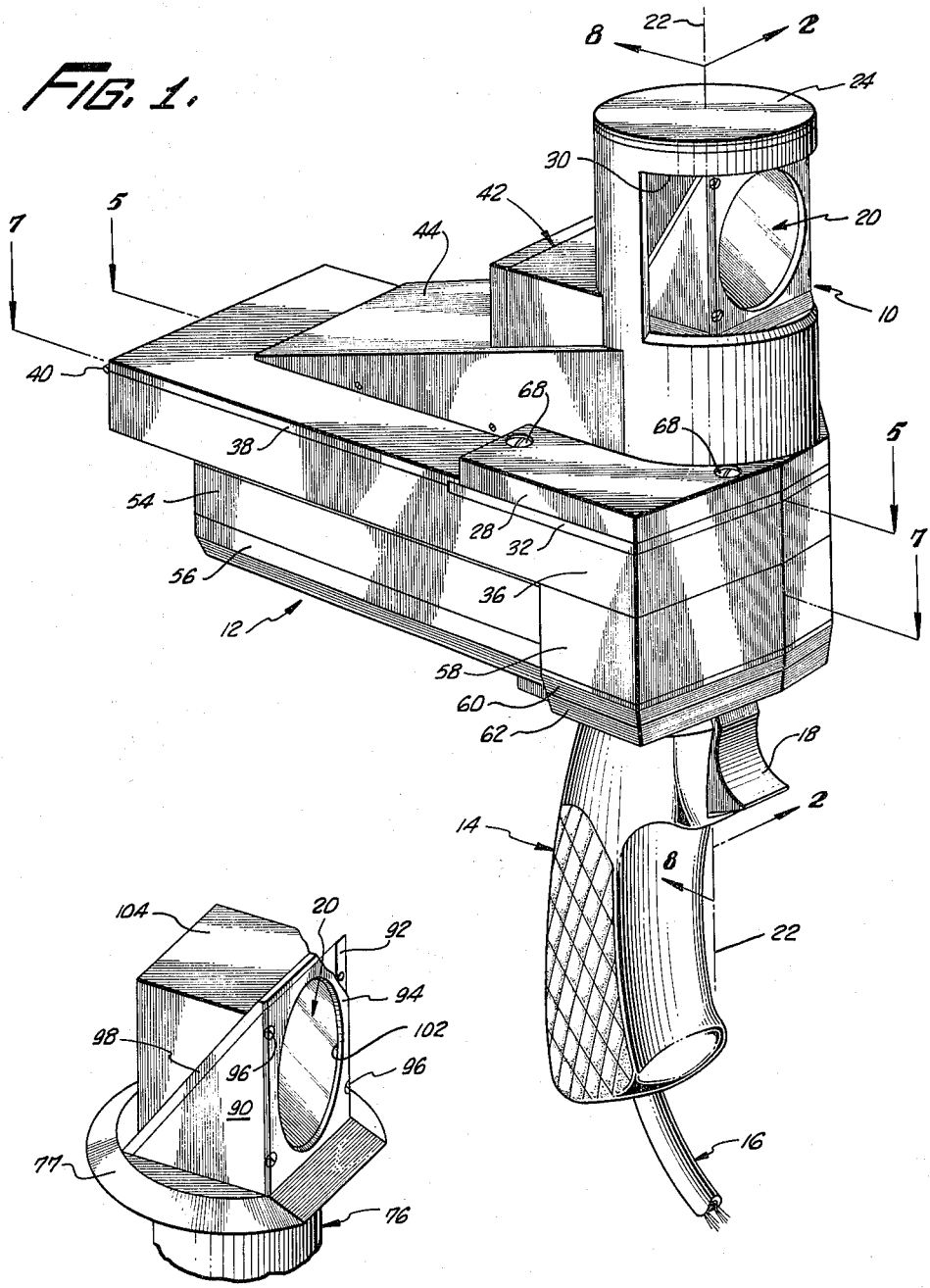
FIG. 1 is an overall perspective view of a first embodiment of a panoramic motion picture camera constructed in accordance with the invention.
FIG. 3 is a fragmentary perspective view of the upper reflecting prism and its supporting structure of the camera of FIG. 1.
Figure 9:
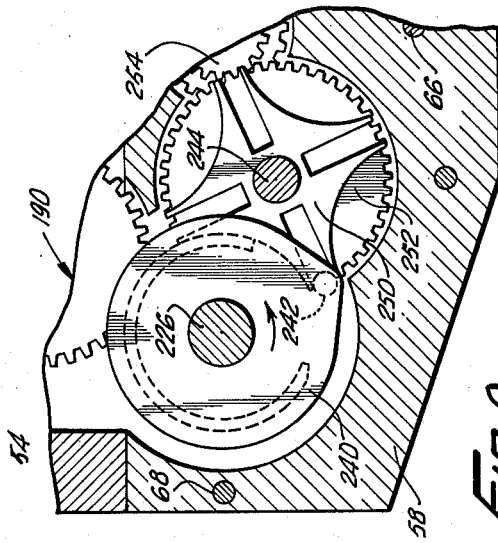
Figure 8:
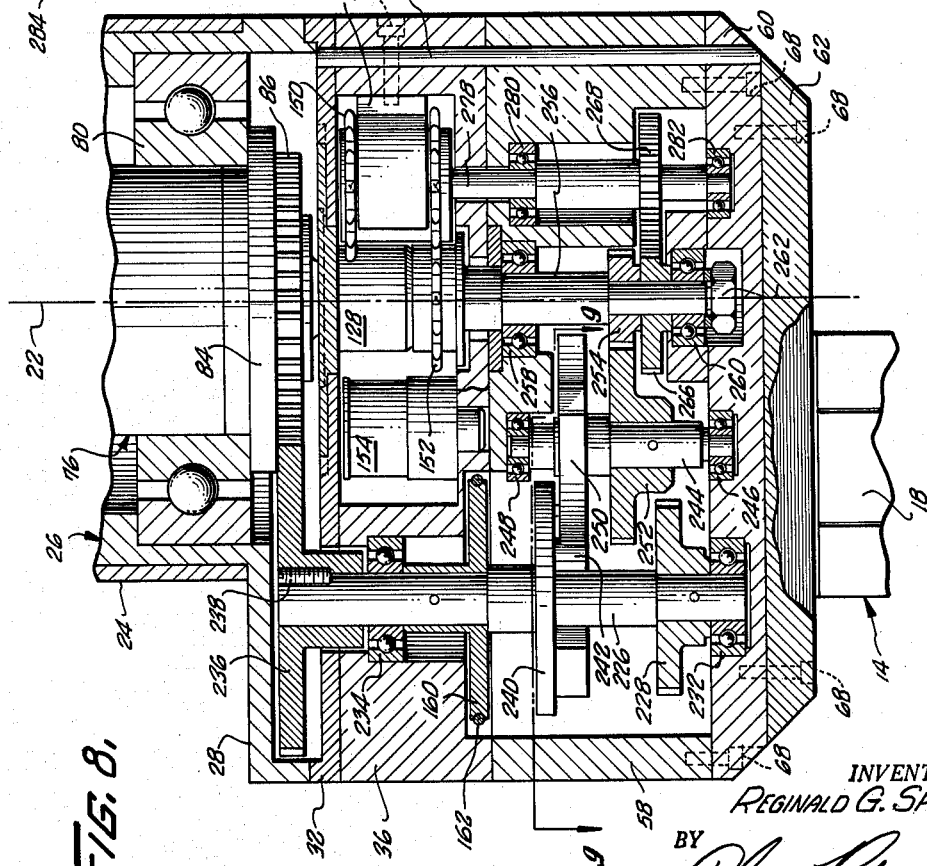
Figure 11:
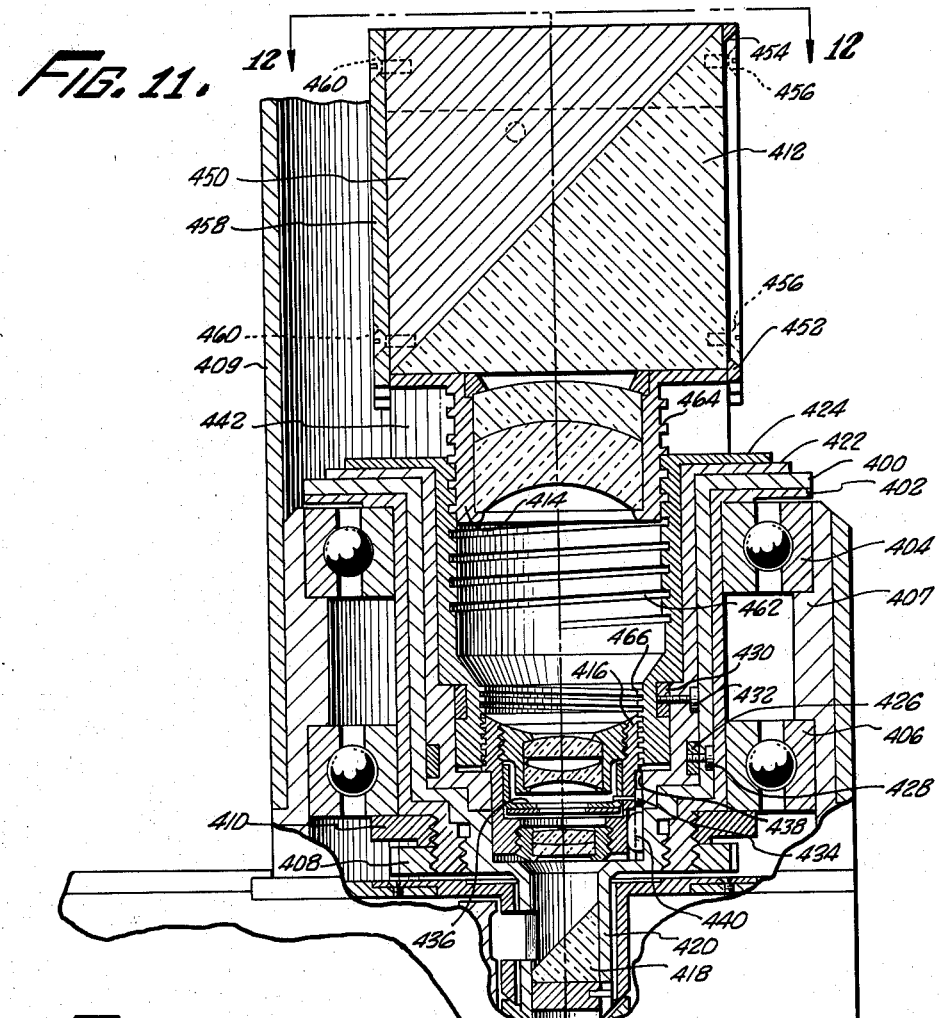
Figure 12:
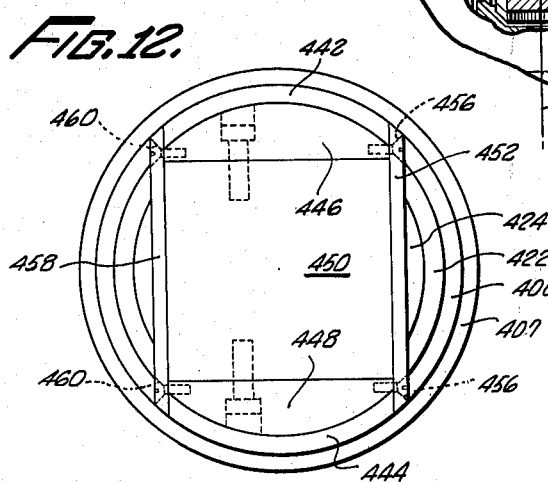
Figure 23:
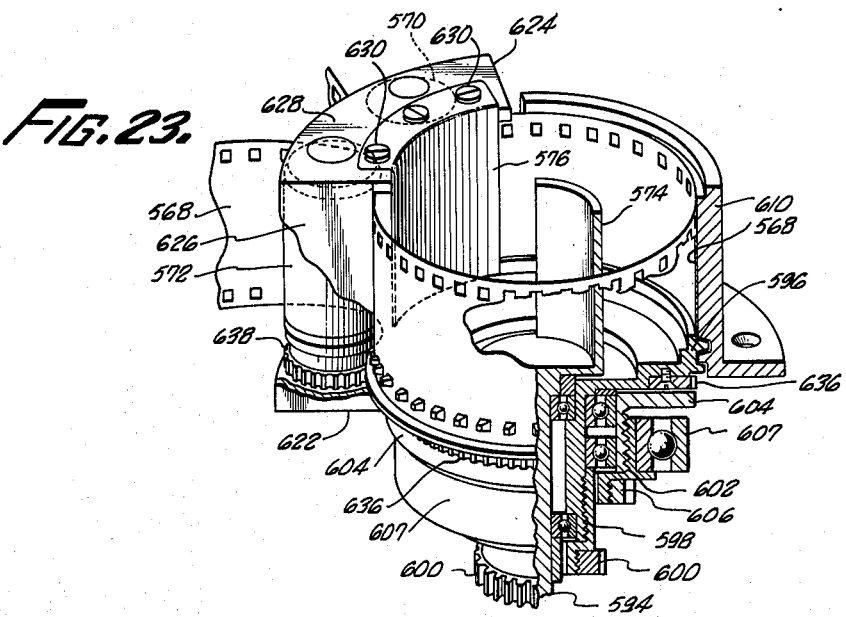
Figure 20:
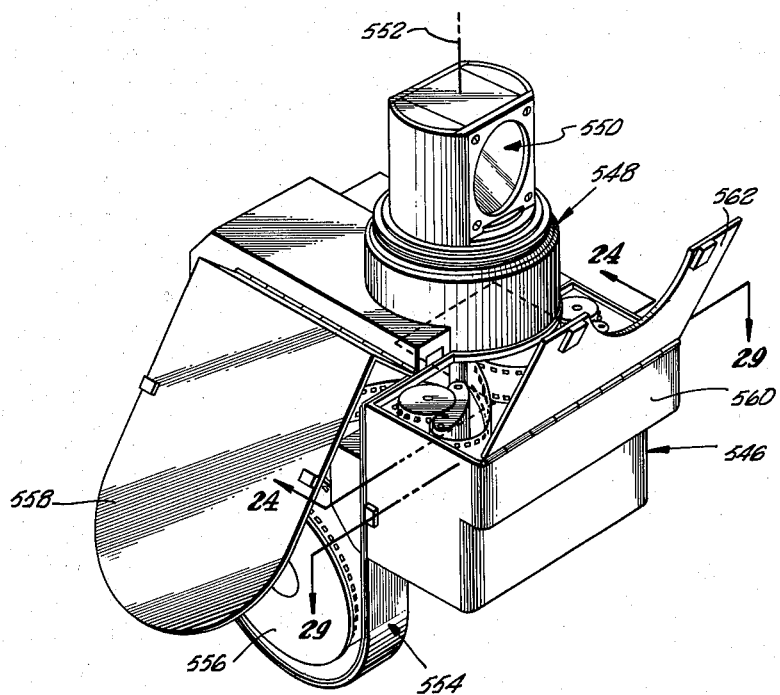
Figure 21:
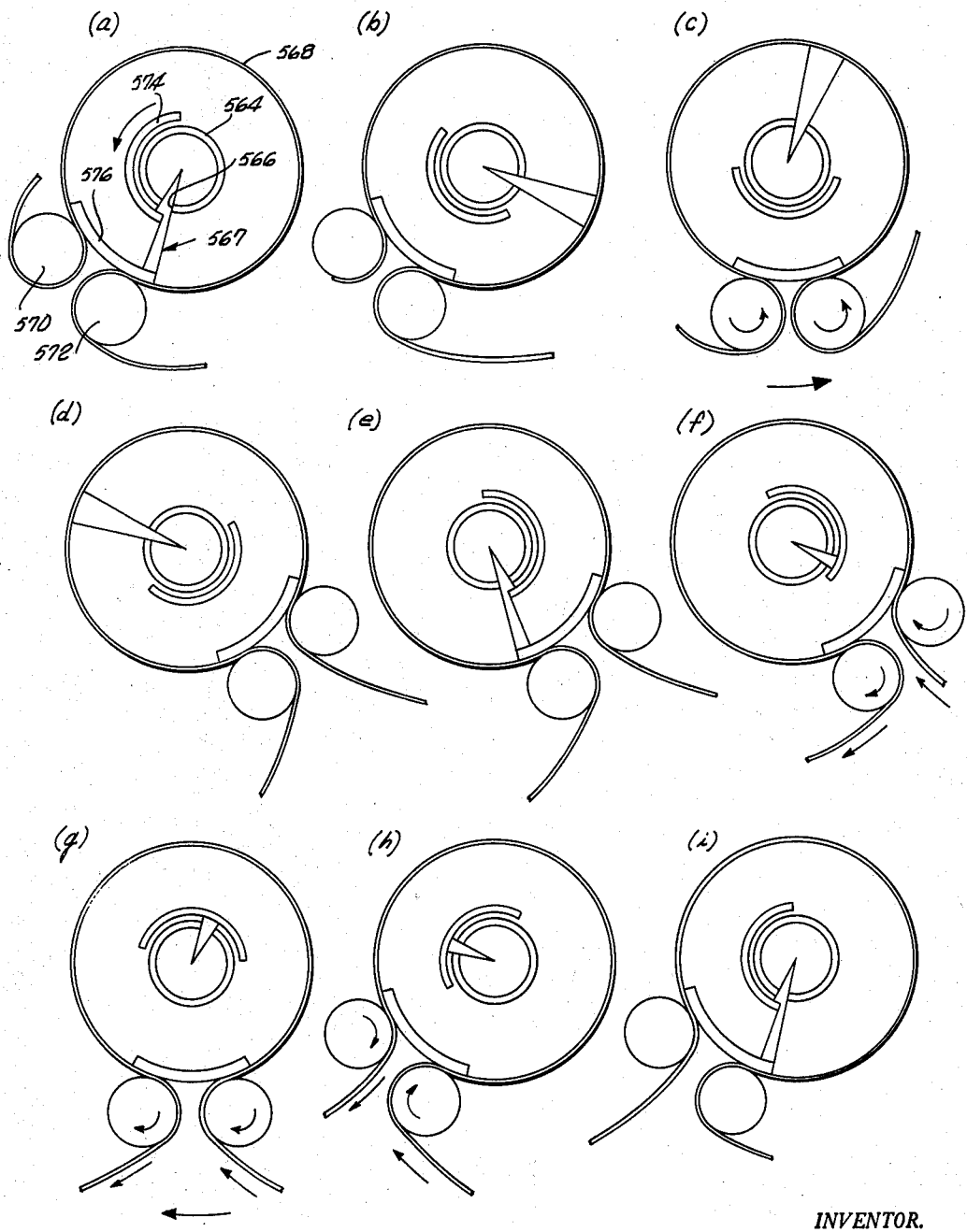
Figure 29:
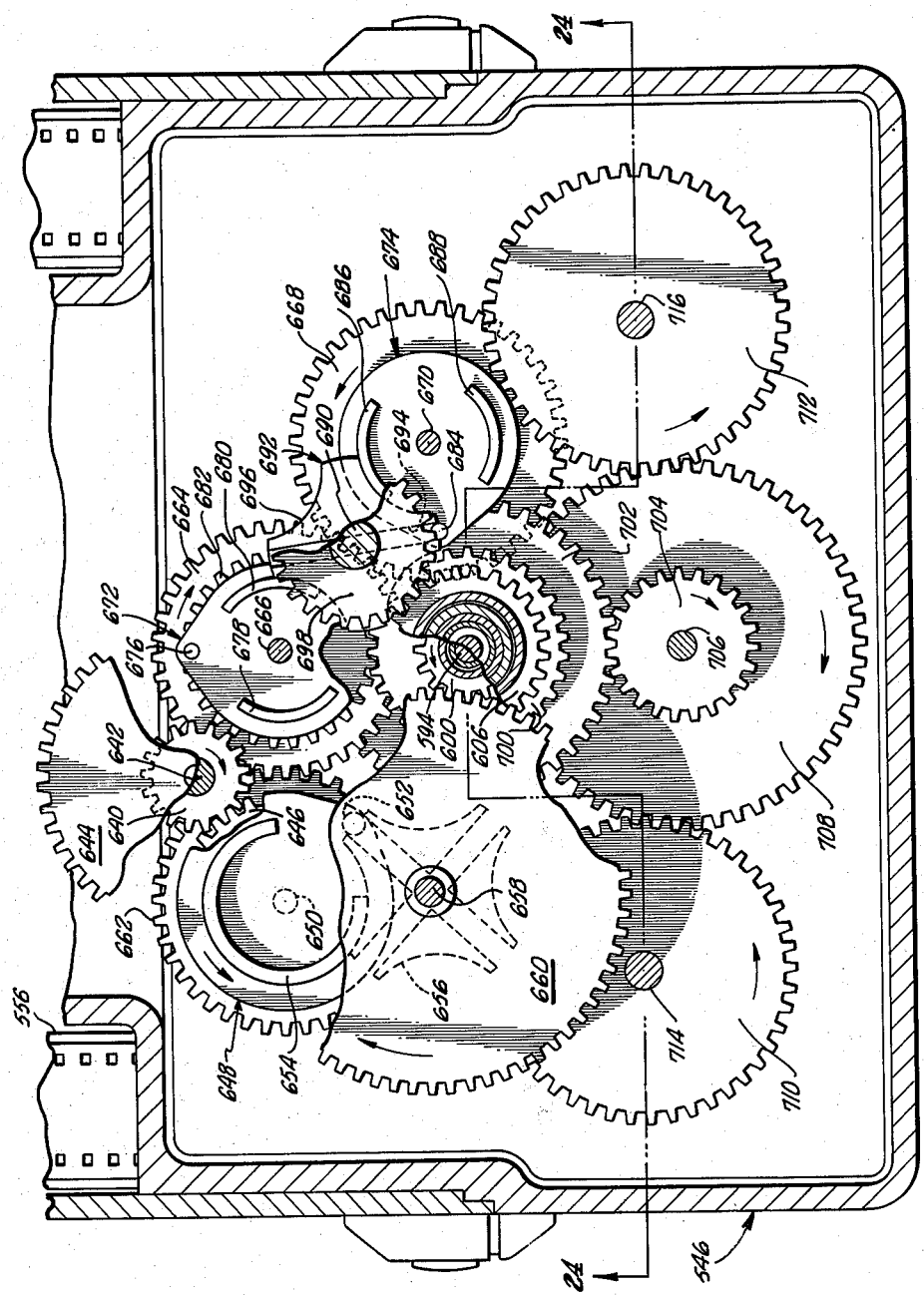

FIGS. 6(a) and (b) are schematic diagrams illustrating the shuttering of light and introduction of unexposed film into the gate according to the operation of the camera of FIG. 1;

FIG. 7 is a view taken generally along line 7—7 of FIG. 1;

FIG. 8 is a fragmentary sectional elevation taken along line 8—8 of FIG. 1;

FIG. 9 is a fragmentary sectional view taken along line 9—9 of FIG. 8;

FIG. 10 is a schematic diagram illustrating optical relationships;

FIG. 11 is a fragmentary sectional elevation of a second panoramic motion picture camera constructed in accordance with the invention and including arrangements for focusing the camera for different object distances;

FIG. 12 is a top view taken along line 12—12 of FIG. 11;

FIG. 13 is an expanded exterior fragmentary perspective of the camera of FIG. 11, illustrating the unitary assembly of the optical system and its removability from the camera;

FIG. 14 is a fragmentary elevation, partially in section, of the unitary optical assembly shown in FIG. 13;

FIG. 15 is a fragmentary sectional elevation of an alternate optical arrangement for a panoramic camera, for taking pictures under water;

FIG. 16 is a sectional view taken along line 16—16 of FIG. 15;

FIG. 17 is a perspective view of a lens retainer employed in the optical arrangement of FIGS. 15 and 16;

FIG. 18 is a fragmentary elevation, partially in section, of an alternate arrangement for supporting the optical system in a panoramic camera wherein the reflectors rotate independently of the lenses;

FIG. 19 is a sectional elevation of a different optical system which may be employed in a panoramic camera according to the invention;

FIG. 20 is an overall perspective view of a third embodiment of a panoramic motion picture camera constructed in accordance with the invention for taking panoramic motion picture frames which encompass an angular extent up to 360°, and more;

FIGS. 21(a) through (i) are schematic diagrams illustrating the shuttering of light and introduction of unexposed film into the gate, according to the operation of the camera of FIG. 20;

FIG. 22 is a schematic diagram illustrating the angular relationship between the light shielding members shown in the schematic diabrams of FIGS. 21(a) through (i);

FIG. 23 is a fragmentary perspective view, partially in section, illustrating part of the structure surrounding the film gate in the camera of FIG. 20;

FIG. 24 is a fragmentary elevation, partially in section, of the camera of FIG. 20, taken generally along line 24—24 of FIG. 20, line 24—24 also appearing on FIG. 29 to better relate the drawings one to the other;

FIG. 25 is a plan view of the camera of FIG. 20 taken generally along line 25—25 of FIG. 24;

FIG. 26 is a fragmentary sectional elevation taken generally along line 26—26 of FIG. 25;

FIG. 27 is a top view of fixed guide members surrounding the gate in the camera of FIG. 20;

FIG. 28 is a sectional view taken along line 28—28 of FIG. 27; and,

FIG. 29 is a fragmentary plan, partially in section, taken generally along line 29—29 of FIG. 20.

Referring now to FIGS. 1 to 9, and especially FIGS. 1 and 2, there is illustrated a first embodiment of a motion picture camera in which a turret 10 extends upwardly from a main camera body 12. Depending from the body is a pistol grip 14 for holding and operating the camera. Electrical energy is supplied over a cable 16 which enters through the pistol grip. Upon depression of a trigger 18, an electrical circuit is completed to a motor, causing an optical system, including an upper reflector 20, to rotate about a vertical axis 22 so as to pan a wide field of view surrounding the camera.

The turret has a removable protective cover 24 which is substantially cylindrical in shape and which has a wide aperture 30 therein opposite the upper reflector 20 to accommodate the wide angle scanning of the optical system. The cover is held in place by a friction fit over an exterior cylindrical portion of a bearing housing 26. The bearing housing 26 has a large flange 28 extending laterally from the bottom thereof, by means of which the bearing housing is securely attached to the body of the camera with screws 68, as shown.

Beneath the bearing housing 26 and bearing housing flange 28 is a mounting plate 32 having a large circular depression therein as indicated for locating the bearing housing 26 on the vertical axis. In this regard, the bearing housing has a cooperating depending cylindrical lip 34. The mounting plate 32 extends across the top of a portion of the magazine housing 36 within which is contained the film reels and film gate for the camera, to be described later.

A cover plate 38 is connected to the top rear edge of the magazine housing 36 by means of a hinge 40. Mounted atop the cover plate is a conventional level indicating mechanism 42 and a streamlined support 44 therefor. The forward edge of the cover plate 38 as well as the forward edges of the level 42 and streamlined support 44 are shaped to fit against the rear edge of the mounting plate 32 and the removable turret cover 24, in a light proof manner. The cover 38 may be opened to expose the film reels by grasping the support 44 and lever 42 and lifting upwardly, thereby pivoting the cover about its connection 40 to the magazine housing 36.

Since in taking panoramic pictures a very wide lateral angle is involved as compared to the vertical angle encompassed in each frame, the effect of having the camera tilted sideways a little bit is quite noticeable when the image is later projected. According to the present invention, this problem is substantially eliminated by incorporating a level into the camera structure which is directly viewable when holding the camera so that the vertical axis 22 of the camera may be kept in a vertical plane. The level is of conventional construction, and includes a floating pointer 46 and cooperating scale 48 contained in a transparent liquid-tight enclosure 50 and viewable through a rear window 52.

In addition to the magazine housing 36, the main elements of the camera body include a motor housing 54, a motor housing cover 56, a gear housing 58, a bearing retainer plate 60, and a base plate 62. The body members of the camera are held together with dowels and screws, in a conventional manner. See, for example, the many dowels shown at 66 in FIGS. 2, 5, 7, 8 and 9, and the many screws shown at 68 in FIGS. 1, 2, 5, 7, 8 and 9. No attempt is made to illustrate all the dowels and screws holding the body members together, for to do so would overly complicate the drawings for an insufficient reason, as such connections are well understood.

Referring now specifically to FIGS. 2, 3, and 4, the basic optical system in the camera comprises the upper reflector 20 which is in the form of a relatively large reflecting prism supported on the vertical axis 22 with its reflecting surfaces inclined on the axis at 45° for intercepting light from the lateral surroundings and reflecting the same downwardly; a lower reflector 70 in the form of a reltaively small first surface mirror supported in an inclined position on the same vertical axis with its reflecting surface parallel to that of the prism for intercepting the reflected light from the prism and reflecting the same in a lateral direction; and, a lens system supported in alignment with the light path (as indicated by the arrows 71) in the camera, including an upper negative lens combination 72 and a lower positive lens combination 74. The lenses in both lens combinations are disposed between the upper and lower reflectors on a common optical axis which coincides with the vertical axis 22.

The optical system, including the lenses and reflectors, is mounted in a sleeve support 76, which is in turn rotatably mounted coaxially on the vertical axis 22 by means of a pair of conventional bearings 78, 80 mounted between the sleeve support 76 and the bearing housing 26. The bearings and sleeve support are retained in position, and the bearings are preloaded, by means of an upper exterior flange 77 on the sleeve support, a central interior shoulder 82 in the bearing housing and a threaded locking collar 84 screwed on to the bottom end of the sleeve support.

A gear member 86 is screwed on to the bottom end of the locking coller 84, and both the gear member 86 and locking collar 84 are fixed by a threaded screw 88 which extends through both of them and into the sleeve support 76. The gear member 86, hereinafter referred to as the turret drive gear, serves to transmit rotary movement to the sleeve support 76, causing the sleeve support to rotate in the bearings 78, 80, whereby the entire optical system, including the reflectors and lenses, rotates about the vertical axis 22.

Considering now the mechanical arrangement of the optical system in more detail, and going from top to bottom, the upper reflecting prism 20 is secured to the sleeve support 76 between two triangular ears 90, 92 which extend upwardly from the upper collar 77 of the sleeve support 76. The prism 20 is held in place beween the two ears by means of a front retainer plate 94 secured to the ears by a plurality of screws 96, and a rear retainer plate 98 secured to the ears by means of a plurality of screws 100. The front plate 94 has a large circular aperture 102 therein for admitting light to the prism.

Since the optical system is to rotate at high speed it must be statically and dynamically balanced in the mechanical sense, so that there will be no vibration. Assisting in this is a counter balance weight 104 secured to the back side of the back plate 98 by means of a plurality of screws 105.

The upper negative lens combination 72 comprises a conventional achromatic pair mounted in a lens housing or cell 106. The lens housing 106 is exteriorly threaded as is the upper interior of the support sleeve 76. The lens housing is screwed into the upper end of the support sleeve until its position is correct, and is secured by set screws (not shown).

The lower positive lens combination 74 is merely an adaption of a conventional photographic objective. It contains two lens pairs mounted in a housing or cell 108, and a conventional iris mechanism 110 and adjustment knob therefor 112. Upon turning the adjustment knob 112, rotary movement is transferred to the iris mechanism 110 by means of a pin 114 extending through the lens housing 108 and riding in an annular slot (not shown) extending part way around the housing. Each lens pair of the lower positive lens combination 74 is carried in a threaded sub-cell, screwed into the main housing 108, as shown. The lens housing 108 has a direct friction fit in the lower end of the sleeve support 76, and its adjusted vertical and axial position is secured by a set screw 116.

The lower reflector 70 is contained within a small cylindrical enclosure 118 which depends from the support sleeve 76 via the lower sub-cell of the lens housing 108. The enclosure is best illustrated in FIG. 4 where it can be seen that the lower reflector 70 is a short section of glass rod cut off at 45° and mirrored to form a first surface mirror. The lower reflector 70 fits the inside of the enclosure 118, and is secured therein by a base member 120 to which it is cemented. The base member fits the inside of the enclosure 118 in a tight friction fit, and its angular position about the vertical axis 22 and hence the alignment between the lower reflector and the upper reflector is assured by a pin 122 extending therefrom and engaged in a short vertical slot 124 at the lower edge of the enclosure. The enclosure 118 has a rectangular opening 126 therein, which extends about the vertical axis for approximately 20°, and defines the outline of the beam of light emerging laterally from the lower reflector.

The embodiment of the camera illustrated in FIGS. 1 to 9 is, when arranged as shown, designed to take pictures wherein each frame encompasses a panoramic view of 180° about the vertical axis. Accordingly, the camera includes a film gate which extends about the axis for at least 180° for supporting a film strip portion 140 in position to receive light reflected laterally from the lower reflector as the optical system turns through the mentioned 180°. As used herein, the term "film gate" refers generally to the structure surrounding and supporting the curved film portion opposite the lower reflector. Ideally the curved film portion should be spherically curved on a radius from the center of the lower reflector; however, cylindrical curvature is easier to accomplish and, for most practical purposes, is sufficient.

As best illustrated in FIGS. 2 and 4, the film gate includes a fixed framing member 128 in the form of a flanged cylindrical sleeve disposed annularly around the depending enclosure 118 that supports the lower reflector. The framing member has a smooth outer cylindrical surface on which the film 140 rides, and has a 180° framing aperture 130 formed therein in alignment with the vertical position of the aperture 126 in the lower reflector enclosure 118. The framing member 128 also has an upper flange 129, and is connected to the mounting plate 32 by means of a plurality of screws 132 extending through this flange 129. As shown, the mounting plate 32 has a stepped circular opening which accommodates and aligns the mating configuration of the flange 129 of the framing member.

Forming the outer side of the film gate is a fixed film guide 134 secured to the floor of the magazine housing 36 by means of a plurality of screws 136. The film guide 134 has a semi-cylindrical upright portion 138 which extends for 180° about the vertical axis at a position spaced slightly outward of the outer cylindrical surface of the framing member 128 and coextensive with the framing aperture 130. The cylindrically curved inner face of the upright portion 138 is centrally relieved as shown to prevent any tendency of the film to score or bind. The separation of the framing member 128 and the film guide 138 is just sufficient to accommodate the film strip 140.

Referring specifically to FIG. 5, the magazine housing 36 contains therein a film supply reel 144 mounted in a conventional manner and outfitted with a conventional friction brake (not shown) which exerts a small frictional force that opposes turning of the supply reel. The film strip 140 is pulled from the supply reel 144 by a feeder sprocket 146 which rotates at a predetermined constant speed so as to meter out film as fast as it is being used and to maintain a loose loop of film 140A in advance of the film gate. A spring loaded film guide 148 keeps the film strip against the feeder sprocket 146.

Also disposed in the magazine housing, and adjacent the film gate, are first and second sprocket wheels 150, 152 of the same size which turn together intermittently in the direction indicated by the arrows to advance film through the gate. The second of these sprocket wheels is referred to as the gate sprocket 152. As will be brought out later, the effective root radius of the gate sprocket is equal to the radius of the film gate.

Following the gate sprocket wheel 152, the film strip 140 passes around a fixed cylindrical film guide 154 having a smooth exterior surface, and extends onto a take-up reel 156. The take-up reel is urged in a counter clockwise direction by means of a conventional pulley and belt arrangement which includes a reel pulley 158, a driving pulley 160, and a wound wire belt 162. When a predetermined amount of force is exceeded, the belt 162 slips on the reel pulley 158. Hence, the take-up reel merely is urged to rotate in the counter clockwise direction with a predetermined amount of force sufficient to keep the film strip 140 extending around the guide 154 slightly taut.

The film strip 140 is urged against the first sprocket wheel 150 by a film guide 151 secured to the wall of the magazine housing 36 by a screw 151A. The film strip is held against the second or gate sprocket wheel 152 by means of the curved front face of the film guide member 134.

Referring now particularly to FIGS. 1, 7, 8, and 9, the camera is powered by an electric motor 164, electrical energy for which is derived through the cable 16 extending into the pistol grip 14. Upon depression of the trigger 18, an electrical circuit to the motor is completed over an extension 16A of the cable. The motor is provided with a conventional speed governing mechanism 166 at the rear end thereof to maintain a constant predetermined speed for the motor. The governing mechanism includes a plunger 168 actuated by cams (not shown) responsive to the outward movement of a pair of arms 170, 172 as a consequence of centrifugal force, so that when the motor exceeds a predetermined speed a contact member 174 in the form of an elongated spring is disengaged from its contact 176, to slow the motor. The motor has an output shaft 178 extending from opposite ends thereof. At the rear end of the motor the output shaft 178 is coupled to the governing mechanism, and at the front end of the motor the output shaft 178 is outfitted with a beveled gear 180. The beveled gear 180 on the front end of the motor output shaft 178 meshes with a corresponding beveled gear 182 fixed to an upright rotatable transmission input shaft 184.

The transmission comprises a first plurality of different sized gears 186 fixed in stacked arrangement to the mentioned transmission input shaft 184 together with the beveled gear 182 a transmission output shaft 188, a corresponding plurality of lower arms pivot mounted on a rod 192 and biased by a plurality of springs 194 against a cam rod 196, each lever arm having a small gear such as is shown at 198 rotatably mounted at the extremity thereof for selectively engaging a pair of the plurality of corresponding gears on the input and output shafts 184, 188. The cam rod 196 may extend past the bottom of the camera body and be provided with a knob (not shown) whereby an adjustment of the cam rod will permit one of the several lever arms to pivot clockwise about the rod 192 under the influence of the spring 194 so as to engage a corresponding pair of the gears in the respective first and second pluralities of gears 186, 190 mounted on the input shaft 184 and output shaft 188 respectively. The result is that several gear ratios are available between the motor shaft 178 and the transmission output shaft 188 by an adjustment of the cam rod 186, so as to provide for different motion picture frame rates. This transmission mechanism is conventional in the details of its construction, and may be found on existing cameras. As shown, the uppermost cam lever arm is in the engaged position.

From the transmission output shaft 188, rotary movement is transferred through a series of meshed gears 200, 202, 204, 206, 208, 210 to a shaft 212 which extends upwardly into the magazine housing 36 to drive the feeder sprocket 146, which as previously explained meters out the film from the supply reel 144 at constant speed.

As shown, gear 200 is fixed to the transmission output shaft 188 and meshes with gear 202 which is fixed to a rotatable shaft 214. Gear 204 is also fixed to shaft 214, and meshes with gear 206 which is fixed on a rotatable shaft 216. Gear 206 meshes with gear 208 which is fixed on a rotatable shaft 218, and gear 208 in turn meshes with gear 210. Gear 210 is fixed to shaft 212, which is rotatable, and to the upper end of which is fixed the feeder sprocket 146.

The gears 208 and 210 are contained within a sub-housing 220 having a cover 222 through which shaft 218 and shaft 212 are journaled. The sub-housing 220 overhangs the side of the camera, hence is provided with an exterior cover 224 screwed to the side of the motor housing 54.

Referring especially to FIGS. 7 and 8, the camera has a primary drive shaft 226 disposed in the gear housing 58 and extending upwardly through the magazine housing 36. Many of the important mechanical movements of the camera are keyed to a particular relationship with the rotation of this shaft, since one revolution of this shaft produces one revolution of the reflectors in the turret. Rotary movement is initially transferred to this shaft from the uppermost of the plurality of gears 190 fixed to the transmission shaft 188, which meshes with a gear 228 fixed to the primary drive shaft 226. The primary drive shaft 226 is at its lower end rotatably supported in a bearing 232 mounted in a recess in the bearing retainer plate 60. Near its upper end, the primary drive shaft 226 is rotatably supported in a similar bearing 234, mounted in a recess in the magazine housing 36.

Atop the primary drive shaft 226, and between the bearing housing flange 28 and mounting plate 32, is mounted a gear 236. The gear 236 is fixed to the primary drive shaft 226 by a threaded screw 238. The gear 236 engages the turret drive gear 86 in a 1:1 ratio so that one revolution of the primary drive shaft produces one revolution of the support sleeve 76 and hence, one revolution of the optical system mounted therein.

Also secured to the primary drive shaft 226 is the driving pulley 160 which drives the belt 162 that in turn drives the take-up reel 156 in the magazine housing.

Finally, mounted on the primary drive shaft 226 is a Geneva driver 240, having a driving pin 242.

Alongside the primary shaft 226 is an idler shaft 244 rotatably supported at opposite ends in bearings 246, 248 which are in turn mounted in recessed portions of the bearing retainer plate 60 and gear housing 58 respectively. The idler shaft 244 carries a conventional Geneva star wheel 250 which cooperates in a conventional and well understood manner with the Geneva driver 240, whereby each revolution of the primary shaft 226 produces an intermittent one-fourth revolution of the idler shaft 244, as seen in FIG. 9.

Fixed to the idler shaft beneath the Geneva star wheel is a transmission gear 252, which engages a gate sprocket drive gear 254 fixed to a gate sprocket drive shaft 256 in a 2:1 ratio. With this arrangement, each revolution of the primary shaft 226 produces intermittently one-half revolution of the gate sprocket drive shaft 256; and, between the one-half revolutions, the gate sprocket drive shaft 256 is held stationary by the locking action of the Geneva mechanism.

As best illustrated in FIGS. 4 and 8, the gate sprocket drive shaft 256 is rotatably mounted axially on the vertical axis 22 by means of upper and lower bearings 258, 260. These bearings are retained by obvious depressions and collars illustrated and are preloaded by means of a nut 262 which screws onto the bottom end of the shaft.

As is especially apparent from FIG. 2, there are two gears fixed to the gate sprocket drive shaft 256 by means of a key 264. The uppermost of these two gears is the gate sprocket drive gear 254, and the lowermost is a coupling gear 266 for transmitting intermittent rotary movement to a similar gear 268 with which it meshes in a 1:1 ratio, and which may be referred to as the first sprocket drive gear.

As best illustrated in FIG. 4, the gate sprocket drive shaft 256 has a flanged collar 270 at its upper end, and has a countersunk threaded bore 272 at this same end. The gate sprocket proper 152 is designed to rest on the top surface of the collar 270, and has a countersunk opening therethrough which forms an extension of the sloping countersunk surface of the bore 272 when the sprocket 152 is in place. A sprocket retainer 274 has a lower outline which is tapered so as to mate with the conical surface provided by the combined countersunk portions of the sprocket proper 152 and the collar 270, together with a threaded stub which screws into the threaded bore 272.

In assembling the gate sprocket wheel structure, the sprocket wheel 152 is disposed atop the hub of the collar 270 of the shaft 256, and the retainer 274 is then screwed into the bore 272, thereby accurately centering the sprocket wheel. The members are then fixed by means of a pin 276 which extends through portions of the retainer 274, sprocket 152, and collar 270.

It is to be noted that the collar 270 has a central hub with an annular flange extending therefrom. The hub is of the same diameter as the flange of the retainer 274. When the sprocket 152 and retainer 274 are assembled to the top of the shaft 256, the flange of the retainer 274 and the upwardly extending hub of the collar 270 effectively define the root radius for the sprocket wheel 152, which is equal to the radius of the film gate (the distance from the vertical axis laterally outward to the inner surface of the film strip 140). This provides a smooth cylindrical surface against which the film rests at its lower edge with the teeth of the sprocket wheel 152 extending through the holes in the film.

The gate sprocket structure is driven by gear 254 in an intermittent fashion through 180° for each 360° of revolution of the sleeve support 76.

The gate sprocket wheel structure must be disposed directly beneath the lower reflector enclosure 118, in sufficient proximity to be able to engage the lower perforations in the film strip 140. This is accomplished by driving the support sleeve 76 from above, and supporting the sprocket wheel 152 from below and driving it from the shaft 256. The uppermost portion of the sprocket wheel structure driven by the shaft 256 is the top of the retainer 274 which is not connected to the reflector enclosure 118. This unique construction permits direct engagement of the film in the very crowded gate area so as to better control film movement.

As best seen in FIG. 8, the first sprocket wheel 150 is fixed on the upper end of a rotatable shaft 278, which is journaled in upper and lower bearings 280, 282 and driven by the gear 268 fixed thereto. The first sprocket wheel 150 is a conventional construction having both upper and lower toothed rings for simultaneously engaging both the upper and lower sets of holes in the film. It moves simultaneously with the gate sprocket wheel 152, and through the same angular distance, although in the opposite direction, by virtue of the engagement between the gears 266, 268 in 1:1 ratio. Since two sprocket wheels are employed, one of which is coaxial with the gate, long frames can be moved into the gate at high speed without unduly stressing the film. Control over film movement in the gate area is very precise.

Figure 6:
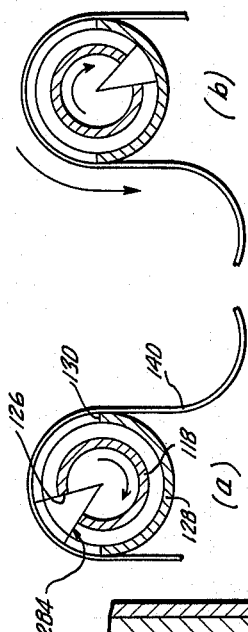

Referring now to FIGS. 6(a) and (b), the basic operation of the camera described in FIGS. 1 through 9 may be readily understood. The light beam emerging laterally from the opening 126 in the lower reflector enclosure 118 is represented at 284. As the reflectors rotate in a clockwise direction continuously, the light beam 284 begins to expose a 180° frame of unexposed film when it passes the edge of the framing aperture 130 in the stationary framing member 128. As the light beam 284 continues to be moved in a clockwise direction it eventually strikes the opposite edge of the framing aperture 130, after passing which it is shielded for 180° by the body of the framing member 128. During the 180° interval when the light beam is shielded by the framing member, the film strip 140 is advanced to introduce a new unexposed film portion opposite the framing aperture 130. This film advancement is accomplished by the synchronized intermittent motion of the sprockets 150, 152. During the film exposure period, the sprocket wheels remain stationary, holding the film opposite the framing aperture 130 stationary. All this may be linked to the operation of the Geneva driver 240 and star wheel 250.

The rectangular shape of the aperture 126 in the enclosure 118 has significance. As the light beam 284 is moved, it is desirable that any point on the film portion be exposed for the same length of time as any other point. This will hold true when the edges of the opening 126 are straight in the vertical direction, as long as the framing member 128 remains at rest, which it does.

In a camera constructed in accordance with the invention, it is found that the optical systems employed must be designed and adjusted so as to eliminate image sweep, that is, so as to cause still objects to remain at rest in the curved film plane on which they are focused as the reflectors rotate about the axis. The adjustment required in the optical system to accomplish this objective will be different for different object distances. It should be noted that the elimination of sweep for objects in focus does not necessarily eliminate sweep for objects out of focus. However, the out of focus effect itself, present in all cameras, is a superseding problem.

The embodiment of the camera illustrated in FIGS. 1 to 9 has a fixed focus. The upper negative lens combination 72 has a relatively long focal length, and the lower positive lens combination 74 has a relatively short focal length, so that the second principal point of the optical system is disposed in free space on the vertical axis below the positive combination. Prior to fixing their position, the lens combinations are adjusted on the vertical axis so that the focal plane of the optical system for the object distance of interest is at the film gate and so that the second principal point lies at a position which eliminates image sweep; that is, which causes still objects to remain at rest in the focal plane as the optical system rotates. This adjustment will, of course, vary with the particular lens system employed. For the lens system shown, when focused for objects effectively at infinity, image sweep for objects in focus is eliminated when the second principal point is disposed adjacent, if not exactly on, the surface of the lower reflector.

It is instructive to consider a specific example of a camera optical system according to the invention, and the adjustments made therein, to eliminate image sweep while maintaining the focal plane for various object distances of interest at the film gate. Such an example is illustrated by FIG. 10, which will now be described physically as well as in accordance with what is believed to be one correct optical theory. It is to be clearly understood that the present invention is not limited to the following particular construction and theory alone.

Referring now to FIG. 10, there is depicted schematically an optical system employed in an experimental model of a camera according to the invention. In this camera, the upper reflector is a first surface mirror 290 and the lower reflector is a first surface mirror 292. Two lens combinations are employed, an upper negative lens combination 294 having a focal length of −63 mm. and a lower positive lens combination 296 having a focal length of +25 mm. The positive combination is an Eastman Ektar camera objective. The lens combinations and reflectors are centered on a vertical axis 298 about which they rotate.

In FIG. 10, a central light ray 300 emanates from an object 302 and is reflected by the upper reflector 290 down through the lens combinations to the lower reflector 292, where it is reflected laterally to a film strip portion 304 supported in the film gate. The upper negative lens combination 294 has a relatively long focal length compared to the lower positive lens combination 296 so that the second principal point H' is disposed on the vertical axis 298 at a position below the lower vertex 306 of the lower lens combination 296 in free space. The first principal point H of the lens system also is disposed on the vertical axis, and at a position above the second principal point H'.

Employing the optical system illustrated in FIG. 10, the following measurements were made whereby image sweep was eliminated while focusing the camera for different object distances and maintaining the location of the focal plane for these objects at the film gate:

| S | S' | A | B | C |
| --- | --- | --- | --- | --- |
| ∞ | 15.75 mm. | 15.75 mm. | 21.44 mm. | 95.44 mm. |
| 270 cm. | 16.25 mm. | 15.75 mm. | 21.64 mm. | 93.14 mm. |
| 100 cm. | 17.39 mm. | 15.75 mm. | 22.09 mm. | 87.44 mm. |
| 50 cm. | 19.43 mm. | 15.75 mm. | 22.97 mm. | 78.72 mm. | where:

S is the object distance;
S' is the optical distance from the film 304 to the second principal point H';
A is the fixed distance from the film 304 to the axis 298;
B is the optical distance from the film 304 to the lower vertex 306 of the positive combination 296; and
C is the optical distance from the film 304 to the upper vertex 308 of the negative combination 294.

It will be noted from the above table that when the camera is focused for objects at infinity, the second principal point H' is coincident with the point of intersection 307 between the vertical axis and the lower reflector. In order to focus the camera on closer objects without incurring image sweep, the negative combination 294 moves downward and at the same time the positive combination 296 moves upward, but by a smaller amount. The second principal point H' moves up the vertical axis slightly from the point of intersection 307, and the effective focal length of the lens system increases.

Shown in FIGS. 11 through 14 is a modification of the basic camera illustrated in FIGS. 1 through 9, the modification serving to illustrate the manner in which the basic camera design readily lends itself to the incorporation of two important innovations, namely a conveniently removable optical system and a mechanism for focusing.

In the camera as shown in FIG. 11, and thinking of the innovation of a removable optical system, a sleeve support 400 is detachably fixed in an outer sleeve 402 by means of exterior threads adjacent the lower end of the sleeve support 400 and cooperating interior threads adjacent the lower end of the sleeve 402. The outer sleeve 402 is rotatably mounted on the vertical axis 405 in bearings 404, 406 and is driven about the vertical axis by a turret drive gear 408 screwed onto the bottom thereof, whereby the sleeve support 400 is also rotated about the vertical axis 405. The outer sleeve 402 preloads the bearings 404, 406 by means of its upper flange and a threaded collar 410 screwed onto the lower end thereof in advance of the turret drive gear 408.

The optical system includes a relatively large upper reflecting prism 412, an upper negative lens combination contained in a lens housing 414, a lower positive lens combination contained in a lens housing 416 and a lower reflector in the form of a first surface mirror 418 contained in an apertured enclosure 420. In this case, the enclosure 420 depends directly from the bottom of the sleeve support 400 to reside within the gate of the camera, rather than from the lower lens housing 416 as before.

This optical system can be removed as a unit by unscrewing the support sleeve 400 from the outer sleeve 402, as is best illustrated in FIG. 13. It may then be replaced with another optical system containing lenses having a different optical characteristic in order to facilitate the photographic purpose at hand, a matter of great convenience and a unique provision in a panoramic camera.

The bearings 404, 406 are contained in a bearing housing 407, as before, and a removable protective cover 409 is provided. Of course, the cover 409 must be removed prior to removing the optical system.

Forming a part of the means for supporting the optical system within the sleeve support is a first interior sleeve 422 which fits coaxially inside the sleeve support, and a second interior sleeve 424 which fits inside the first interior sleeve. The first interior sleeve 422 is referred to as the iris adjustment sleeve and the second interior sleeve 424 is referred to as the focusing sleeve.

The iris adjustment sleeve 422 has a friction fit inside the support sleeve 400 which is reasonably tight but not so tight as to prevent the iris adjustment sleeve from being turned about the vertical axis 405 within the support sleeve in order to deliberately adjust the iris. The iris adjustment sleeve is held within the support sleeve 400 by means of an annular ring 426 which slides in the circumferential direction within an accommodating circumferential slot in the body of the iris sleeve 422 adjacent the lower exterior thereof. A screw 428 which extends through the body of the support sleeve 400, engages the slidable annular retaining ring 426, so as to prevent upward removal of the iris sleeve 422 out of the support sleeve. A similar arrangement of a slidable annular retaining ring 430 and a screw 432 holds the focusing sleeve 424 within the iris adjusting sleeve 422, yet permits deliberate turning of the focusing ring therein against a substantial, but not prohibitory, friction force.

When the iris sleeve 422 is turned about the vertical axis, a pin 434 which extends through an annular slot (not shown) in the lower lens housing 416 engages an iris adjusting mechanism 436 which moves circumferentially relative to the housing 416 to adjust the iris. This pin moves because the head of it is caught in a vertical slot 438 in a lower interior portion of the iris adjustment sleeve. The lower lens housing 416 does not turn about the vertical axis because it is held stationary as far as turning is concerned by means of a key 440 engaged in opposing vertical slots on the exterior and interior of the lower part of the lens housing 416 and sleeve support 400 respectively. The vertical slots accommodating the key 440 both permit and limit the movement of the lower lens housing 416 to longitudinal movement along the direction of the vertical axis. The slot 438 for the head of the pin 434 is merely necessary to accommodate vertical movement of the lens housing 416. Of course, the lens housing 416 does rotate about the vertical axis when the optical system as a whole rotates about this axis.

Thinking now specifically of the arrangement for focusing the camera for different object distances while maintaining the focal plane location constant at the film gate, a clear understanding requires a further description of the structural innovations incorporated in the camera with reference to FIGS. 11 through 14.

Extending upwardly from opposite sides of the upper flange of the support sleeve 400 are two cylindrically curved ears 442, 444. The upper reflecting prism 412 is secured atop an upper flange of the upper lens housing 414. Extending upwardly from the upper flange of the lens housing 414 are a pair of upright members 446, 448 each having an outer surface which is cylindrically curved to mate with inner surfaces of the support sleeve ears 442, 444 respectively. The inside surface of the uprights 446, 448 are flat and bear against the sides of the upper reflecting prism 412 as well as against a counterweight 450 which serves to balance the column mechanically for proper rotation. The counterweight is fixed to the uprights 446, 448 by screws as shown. A front cover plate 452, having a wide circular aperture 454 for admitting light to the upper reflecting prism, is connected to the front edges of the uprights 446, 448 by means of a plurality of screws 456. The lateral edges of the apertured cover plate 452 extend across and mate in sliding contact with the front edges of the sleeve support ears 442, 444. A rear plate 458 is similarly connected to the uprights 446, 448 by a plurality of screws 460, with the lateral edges of the rear plate overlapping to slidingly contact the rear edges of the sleeve support ears 442, 444. With this construction, the reflecting prism 412 and balance weight 450 are held securely together and fixed to the upper lens housing 414; and, all movement of the lens housing 414, its uprights 446, 448, the prism 412, weight 450, and cover plates 452, 458 is limited to longitudinal movement along the direction of the vertical axis, because of the sliding engagement with the sleeve support ears 442, 444. Of course, the lens housing 414 and its appurtenances rotate when the whole optical system rotates, i.e. when the sleeve support 400 is rotated about the vertical axis by virtue of being fixed to the outer sleeve 402 which is driven by the turret drive gear 408.

It should be noted that the upper flanges of the iris sleeve 422 and the focusing sleeve 424 are both smaller in diameter than the distance between the inner cylindrical surfaces of the sleeve support ears 442, 444. Hence, these sleeves may be rotated to the degree desired in order to carry on their adjustment functions.

The focusing sleeve 424 has an upper set of interior threads 462 formed therein, and engaged by a corresponding set of exterior threads 464 formed on the exterior of the upper lens housing 414. Also, the focusing sleeve 424 has a lower set of internal threads 466 formed in the interior thereof which engages a matching set of exterior threads on the exterior of the lower lens housing 416. It will be noted that the upper threads and lower threads are of different pitch and different directions, so that when the focusing sleeve 424 is turned, the upper and lower lens housing together with their respective appurtenances, move upwardly or downwardly on the vertical axis by predetermined distances, depending upon the respective rates and directions of the upper and lower threads. As previously explained, motion of both lens housings is limited to longitudinal movement along the vertical axis.

In designing a camera which can be focused, the amount and direction of movement of various elements in the optical system will vary depending upon the particular design of the system. Under the conditions described above with reference to the system shown in FIG. 10, an examination of the tabulated figures for focusing on different object distances shows that the upper negative elements and the lower positive elements are moved by different amounts and in different directions. An examination of these tabulated figures also shows that, by means of a common focusing sleeve 424, appropriate adjustment may be made to both the upper and lower lens combinations while employing upper and lower threads having constant, although different, rates. It is contemplated, however, that adjustments may be required, depending on the particular optical system chosen wherein the thread rates would vary along their length in order to adjust the position of the lower and upper elements simultaneously by turning one sleeve. This can be accomplished by using a thread or cam having a varying rate together with a cam follower. So far as purposes of this application and its claims are concerned, a cam arrangement is deemed entirely the equivalent of a threaded arrangement and is merely one form thereof.

Once a particular optical system is chosen for employment in the camera of the invention, it is necessary to make measurements to determine the position, and the amount and direction of movement required of the various elements for focusing purposes. Once these measurements are made, the rates and directions of the threads or cams can be predetermined for the particular optical system.

Referring now to FIGS. 15 to 17, there is shown an alternative optical design and turret construction whereby a camera according to the invention is especially adaptable for taking pictures under water. A reflecting prism 470 is supported between a pair of triangular ears 472, 474 extending upwardly from the upper flange of a support sleeve 476. A back plate 478 is connected to the ears by a plurality of screws 480. Mounted on the rear of the back plate is a counterweight 482, secured by a plurality of screws 484. A front retainer plate 486, best shown in FIG. 17, is attached to the ears 472, 474 by means of a plurality of screws 488. The front plate supports the prism 470 in position, and in addition supports a lens 489 opposite the front surface of the prism. The housing of the camera must, of course, be water tight, and includes an upper protective cover 490. The cover has a transparent cylindrical portion 492 centered about the vertical axis 493 and a top portion 494 cemented to and enclosing the upper end of the transparent cylindrical portion. The lower end of the transparent cylindrical portion 492 of the cover 490 is sealed and held on the camera by means of an internally threaded annular cap 496 which screws onto external threads on a bearing retainer 498 and compresses a rubber sealing ring 500.

With the foregoing construction, the camera may be immersed under water and operated without stirring up the water in the vicinity, in that the rotating sleeve support and optical system is contained inside the cover 490, the transparent portion of which provides a uniform optical distortion at all positions about the vertical axis. This optical distortion results from the curved nature of the cylindrical transparent portion 492 in the underwater environment. The distortion is eliminated by the addition of the lens 489, which is ground to compensate for this distortion.

FIG. 18 shows an arrangement whereby the reflectors may be rotated independently of other portions of the optical system. The lenses are mounted in a housing 502 fixed to the body of the camera by threaded engagement in the top of a flanged member 504. The upper reflector 506 is secured atop a sleeve 508 rotatably journaled in a bearing housing 510. The sleeve 508 is driven by a gear 512 fixed to the lower end thereof which engages a gear 514 fixed on a primary drive shaft 516. The lower reflector 518 is driven in synchronism with the upper reflector 506 by means of a stub shaft 520 on which it is mounted. The stub shaft 520 is rotatably journaled within a hollow shaft 522 which carries at its upper end a gate sprocket wheel 524 that engages the film 525. The stub shaft 520 is driven at the same speed as the sleeve 508 by means of a gear 526 secured to the shaft adjacent the bottom end thereof, which meshes with a gear 528 secured to the primary drive shaft 516. Also, the power input to the primary drive shaft is through the gear 528. The hollow shaft 522 that carries the gate sprocket wheel 524 is rotatably journaled to the body of the camera and has fixed at the lower end thereof a gear 530 by means of which intermittent motion is transferred to the shaft for advancing the film 525.

A different optical system which may be employed in a panoramic camera according to the invention is illustrated in FIG. 19. In this system, a sleeve support 532 carries an upper reflecting prism 534 and counterweight 535. Mounted in the lower end of the sleeve support is a lower reflector 536 which reflects the light received from the upper reflector in a lateral direction as indicated by the arrows 537. A first positive lens combination 538 is mounted coaxially in the sleeve support above the lower reflector, and a second positive lens combination 540 is mounted coaxially with the central light ray emerging laterally from the lower reflector. With this arrangement, the second principal point of the optical system will be located between the two lens combinations 538, 540 so that it is positioned on the vertical axis adjacent the lower reflector. When the camera is focused for objects at infinity, the focal length of this optical system is equal to the radius of the film gate, and the principal point of the optical system is located at the point of intersection 542 between the vertical axis 544 and the reflecting surface of the lower reflector 536. This eliminates image sweep so that images of still objects effectively at infinity remain at rest in the focal plane as the support sleeve 532 rotates about the vertical axis 544.

FIGS. 20 through 29 illustrate an embodiment of the camera of the invention capable of producing frames having a length, in terms of angular extent about a vertical axis, up to 360° or more. An exterior perspective view of this embodiment is shown in FIG. 20. The camera has a body 546 extending upward from which is a turret 548 supporting an optical system 550 for rotation about a vertical axis 552. Depending from each side of the body adjacent the rear thereof is a reel housing, one of which is shown typically at 554. The reel housing contains a reel 556 for the film, and has a cover 558 hinged to the camera body. Film extends from the reel 556 in the reel housing into a magazine chamber 560 provided with a hinged cover 562 which enables access to load the film in the camera.

The embodiment of the camera illustrated in FIGS. 20 through 29 contains a suitable optical system, which is not illustrated in detail in these figures because suitable optical systems have already been described. For example, the optical system in the camera may be similar to that shown and described with respect to the embodiment of the camera illustrated in FIGS. 1 through 9; or, for example, it may be similar to the optical system containing the focusing provisions, illustrated in FIGS. 12 through 14. In any case, the optical system includes an upper and lower reflector and a plurality of lenses, and has its focal plane disposed at the film gate surrounding the lower reflector.

Before getting into the structure of this embodiment of the camera, attention is drawn to FIGS. 21(a) through (i) wherein the basic operation for introducing successive unexposed film portions to the film gate after each succeeding one is exposed is illustrated diagrammatically. To the extent that they are applicable, the reference numerals applied in FIGS. 21(a) through (i) will be carried over to the corresponding structure for better correspondence and understanding.

Referring to FIG. 21(a), an enclosure 564 which carries the lower reflector has a rectangular aperture 566 therein for defining the extent of the light beam 567 emanating laterally from the lower reflector. A film strip portion 568 is supported in a substantially cylindrical fashion about the lower enclosure 564 in the film gate of the camera. A pair of cylindrical film guide members or rollers 570, 572 are disposed vertically side by side adjacent the exterior of the cylindrical film gate. The film strip 568 passes between the rollers to extend around the gate. Within the film gate is an inner light shield 574 and an outer light shield 576. As the following description will show, the inner light shield functions to shield the light from the film gate during at least a substantial portion of each alternate revolution of the reflectors; the outer light shield 576 cooperates by moving between two rest positions to determine the beginning and end of each frame by protruding slightly past the inner light shield at the appropriate time; and, the film guide rollers 570, 572, which move between two rest positions together with the outer light shield 576, serve to unwrap an exposed film portion and wrap an unexposed film portion on the gate during each frame exposure period in order to extend the angular encompassment of each frame to or beyond 360°.

The inner light shield is driven about the vertical axis in a continuous manner in the same direction as the reflector rotation, but at one-half the angular speed. Movement of the reflectors is indicated by angular displacement of the light beam 567. As an examination will show, the light beam catches up with the inner light shield 574 each alternate revolution.

FIG. 21(a) depicts the instant when the film guide rollers and the outer shield 576 are at rest in a first position; the film strip portion in the gate is unexposed film extending into the gate around the roller 572 and coming out of the gate around the roller 570, with a substantial portion of the film extending around and out of the roller 570 being also unexposed film; the optical system, hence the lower reflector and enclosure 564, is rotating in the direction of the arrow at a constant angular speed ω; the light beam 567 emanating from the lower reflector has its leading edge coincident with an edge of the outer shield 576; the inner light shield 574 is rotating in the same direction as the reflectors at an angular speed of ω/2 and its leading edge is cutting off one-half the angular extent of the light beam 567. More generally, the instant depicted in FIG. 21(a) is the instant at which a frame exposure begins.

As seen in FIG. 21(b), the light beam which progresses at an angular speed ω is falling on unexposed film in the gate. When a sufficient amount of film in the frame has been exposed, as depicted in FIG. 21(c), the outer light shield 576 together with the guide rollers 570, 572 begins moving in the same direction as the reflector rotation, whereby a portion of the exposed film constituting part of this frame is unwrapped from the film gate and a new unexposed portion is wrapped onto the film gate, all as the light beam continues to expose film and while the film in the gate is held stationary except for the wrapping and unwrapping in the vicinity of the guide rollers. In FIG. 21(d), the guide members and the outer shield have arrived at a predetermined second rest position in anticipation of defining the end of the frame.

FIG. 21(e) shows the instant of termination of the exposure of the picture frame, at which instant the light beam has, to the extent of half its angular width, caught up with the inner light shield. At this instant, the trailing edge of the light beam is coincident with the edge of the outer light shield 576.

As illustrated in FIG. 21(f) the extent of the outer light shield is sufficient to permit the light beam to become fully shielded by the inner light shield without again falling on the film.

During the interval when the light is shielded from the film, the film advancing mechanism begins to move a new length of film through the film gate whereby the exposed frame is carried outwardly past the guide roller 570 until along with it is a sufficient strip of unexposed film to accommodate the next wrapping operation. At the same time, and while the light beam is shielded by the inner shield, the guide rollers and outer light shield begin to move back to their first rest position, as indicated in FIG. 21(g).

As depicted in FIG. 21(h), the guide members and outer light shield have arrived back at their first rest position, and movement of the film through the gate has ceased, prior to the light beam advancing off the inner shield. The latter occurs in FIG. 21(i) which is identical with FIG. 21(a) except that a new unexposed film strip portion is in the film gate, and is now about to be exposed by a repetition of the described procedure.

FIG. 22 supplements FIGS. 21(a) through (i) to indicate the angular extent and the phase relationship between the light shields and light beam from the lower reflector. The solid line portion of FIG. 22 depicts the situation where a frame is about to begin exposure. The frame is intended to have a total angular extent of 390°, necessitating an overlap of 30°.

The angular extent A of the aperture in the lower reflector enclosure is 20°. The outer light shield has an angular extent C of 60°. The inner light shield has an angular extent D of 155°. The edge of the outer light shield leads the leading edge of the inner light shield by 10°, or one-half the angular extent A of the light beam. Hence, the edge of the outer shield, which is at rest, determines the beginning of the frame. A sharp exposure at the beginning of the frame requires that it be exposed for the same length of time as any other portion of the frame. This requirement is fulfilled when the outer shield is at rest and leads the inner shield by at least the stated amount. Thus, by the time the light beam has moved fully off the outer light shield, the leading edge of the inner light shield will be no more than coincident with the edge of the outer light shield, so that the point adjacent the edge of the outer light shield will have received a full exposure from the full sweep of the light beam. This would not be true if the outer light shield led the inner light shield by any angle less than half the width of the light beam.

The dotted line portions of FIG. 22 represent the instant when a frame exposure is terminated. The outer light shield is moved to the second rest position at this time, which causes its effective edge (leftmost edge) to be disposed an angular distance B of 30° beyond what was before its effective edge (rightmost edge). By this angular distance B, the extent of the motion picture frame produced will exceed 360°. The point on the film adjacent the effective edge of the outer shield will receive a full exposure again because the edge of the outer light shield effectively is in advance of the inner light shield by an angular distance of one-half the extent of the beam. Thus, the leading edge of the light beam is first cut off when it becomes coincident with the effective edge of the outer shield, at which instant it will also be coincident with the edge of the inner light shield, so that the point on the film adjacent the effective edge of the outer light shield receives a full sweep of the beam and hence a full exposure.

While it is possible to eliminate the extent to which the outer light shield protrudes past the inner light shield at both the beginning and end of each frame, and for that matter possible to eliminate the outer light shield entirely, the results will be inferior and there will be fade-out at the edges of each frame. If the outer light shield is retained, it is possible to obtain good results by substituting an optical shutter like a Kerr cell or conventional rotating shield in the vertical optical column to take over the function of the inner light shield. This, however, is mechanically cumbersome.

The provision of an overlap within each frame, that is extending each frame beyond 360°, is of more than academic importance. For example, any projecting arrangement would necessarily have a position in the projected image whereby the front edge of each frame met the trailing edge to merge into a 360° picture. When an object is disposed at this point of merger, there is always likely to be some visual effect. If nothing else, the fact that one part of the object was taken at an instant in time which was at the beginning of the frame and other parts of the object at an instant of time which was at the end of the frame, might of itself be enough to spoil the picture at the merger point. This could be very important in a military monitoring situation where it was desirable to study an object at this point. By having more than 360° in each frame it is possible to effectively move the position at which the beginning of the frame merges with the end of the frame on the projected image, thereby to take an object of interest out of this area so as to view it with more clarity and accuracy.

Considering now the mechanism of the camera of FIG. 20, and referring to FIGS. 23, 24, and 25, it can be seen that the enclosure 564 for the lower reflector depends from the optical column 550 to reside centrally within the film gate. As in the other cameras, the optical column is contained in a support sleeve 580 mounted for rotation about the vertical axis 552 within a bearing support 582. At the lower end of the sleeve support 580 is a turret drive gear 584 by means of which continuous rotary movement is transmitted to the optical column 550 including the lower reflector. Film 568 is metered from a supply reel (not shown) at a constant rate by a sprocket 586, cooperating with which is a spring loaded film guide 588. The film is metered out at a sufficient rate to maintain a loose loop of film 568A in advance of the gate sufficient to accommodate the amount of the film required for a new frame. On the opposite side of the camera a similar sprocket wheel 590 and cooperating spring loaded film guide 592 meters out the film 568 to the take-up reel 556 at a constant rate, calculated to maintain a sufficient loop of film 568B available to accommodate the film wrapping operation during each film exposure. If desired, the loose film loops 568A, 568B may each be retained under a slight amount of tension in an accommodating vacuum column (not shown) as is done with magnetic tape in magnetic recording equipment, to keep it from flapping around as the camera operates.

Referring now to the structure surrounding the gate in the camera, as illustrated in FIGS. 23 through 28, the inner light shield 574 is in the form of a curved plate extending upwardly from a flange on the upper end of a central shraft 594. A gate sprocket wheel 596 is formed as an annular collar on a sleeve assembly 598 which is bearing mounted on the central shaft 594 and provided at its lower end with a sprocket drive gear 600 so that the sprocket wheel may be rotated independently of the central shaft 594. A gate sprocket wheel 596 is formed as an assembly 598 for the sprocket wheel is a further sleeve assembly 602 which carries a guide roller support flange 604 at its upper end and a drive gear 606 at its lower end. By virtue of its mounting, the guide roller support flange may be rotated independently of the sprocket 596 and inner shield 574. The entire telescoped assembly is journaled in two main bearings, an upper bearing 607 mounted to the camera body 546 and engaged with the exterior of the sleeve assembly 602 of the guide roller support flange 604, and a lower bearing 608 fixed in the camera body 546 and engaging the lower end of the central shaft 594.

The sprocket wheel 596 is a full annular ring having teeth for engaging the lower holes in the film and having a root radius equal to the radius of the film gate. The sprocket wheel in effect defines a portion of the film gate and to this end assists in supporting the film around a substantially cylindrical path. The balance of the gate is defined by a lower gate film guide member 610 which is fixed to the camera body and an upper gate film guide member 612 also fixed to the camera body and forming a cap extending across the top of the lower guide member.

The structure of the upper and lower gate film guide members is best seen in FIGS. 27 and 28. From these figures it can be seen that the lower gate guide member 610 has a substantially cylindrical curvature and extends part way (approximately 210°) about the vertical axis 552. The upper gate guide member 612 is formed as a segment of an annular ring extending for the same distance about the vertical axis 552, with a depending ring portion thereof 614 extending the full way about the axis. This depending portion 614 of the upper guide 612 will be referred to as the upper film support. The lower film support is provided by the sprocket wheel, which also extends the full distance around the film gate. Formed in the top of the upper film guide 612 is an opening 616 for accommodating the enclosure 564 that holds the lower reflector of the optical system.

The reason for the cutout segment of the upper and lower gate film guides 610, 612 is to accommodate the cylindrical film guide rollers 570, 572 which wrap the film around the gate. This pie-shaped cutout portion has an angular extent of about 150°, and extends into the body of the camera as seen at 618 in FIGS. 25 and 26. The reason for the 150° extent may be seen from a consideration of FIG. 22 wherein the total angular space required for the outer light shield 576 is shown as 150°.

The film guide rollers 570, 572 are mounted in a box-like frame having a bottom wall 622, end walls 624, 626 (FIG. 25) and a top wall 628. The bottom wall 622 is an annular segment extension of the guide roller support flange 604, having an angular extent of about 60°. The top wall 628 has the shape of an annular segment and is supported by the end walls 624, 626 which are planar and oriented radially from the vertical axis. The rear and front sides of the box frame supporting the guide rollers are open so that the film 568 is free to extend between the film guide rollers 570, 572 and around the gate. A counterbalance weight (not shown) may be fixed to the guide roller support flange 604 at a position opposite from the rollers and box frame, to mechanically balance the assemblage for rotation about the vertical axis.

The outer light shield 576 is in the form of a thin cylindrically curved plate which depends from the front edge of the top wall 628 of the box frame, which front edge overlaps the top of the film 568 and the upper film support 614. The outer light shield 576 is connected to the wall 628 by means of a plurality of screws 630 as indicated.

Referring specifically to FIG. 26, the sectional view of the guide roller 570 indicates the typical construction. As shown, the roller is substantially cylindrical and rotatably mounted between the upper and lower walls 628, 622 of the box frame on a spindle 632. Secured to the lower end of the roller 570 is a small gear 634, which meshes with a gear 636 fixed to the lower edge of sprocket wheel 596. As seen in FIG. 23 a similar gear 638 is secured to the lower end of the other roller 572, which also meshes with the gear 636 fixed on the sprocket. The consequence of this construction is that any time there is movement of the film through the rollers 570, 572, whether it be as a result of film wrapping or as a result of introducing a new unexposed frame into the gate by movement of the gate sprocket wheel 596, or both, the rollers 570, 572 rotate about their own vertical axes so as to assist in the manipulation of the film.

As most clearly seen in FIG. 26, each of the rollers has its outer cylindrical surface disposed adjacent the exterior of the cylindrical film gate and has a mating configuration with the upper film support 614 and the toothed exterior of the sprocket wheel 596, being spaced away from these members only so far as is necessary to accommodate the thickness of the film 568. This arrangement provides adequate support for the film over the cut-out segment in the gate film guides 610, 612, within which the rollers are moved between first and second rest positions, being carried by their box frame which, via its lower wall 622 is an extension of the guide roller support flange 604.

The mechanisms for facilitating the various motions required for the light shields, sprocket wheel and guide rollers is best illustrated in FIGS. 24, and 29.

Referring first to FIG. 29, a conventional electric camera motor and power train (not shown) drives a power input gear 640 in a clockwise direction, hence drives a power input shaft 642 to which the power input gear is fixed in the same direction.

Fixed to the top of the power input shaft 642 is a transmission gear 644. As best seen in FIG. 24, this is the gear that engages the turret drive gear 584 to rotate the sleeve support 580, hence the optical system, about the vertical axis 552 at constant speed. The gear ratio between the transmission gear 644 and the turret drive gear 584 is 1:1, so that for each revolution of the power input shaft 642 there is produced a single revolution of the sleeve support 580.

Referring to FIG. 29, the power input gear 640 is engaged in a 1:2 gear ratio with a geared portion 646 of a Geneva driver 648 fixed on a rotatable pedestal mounted shaft 650. Every two revolutions of the power input shaft 642 produces one revolution of the Geneva driver 648, hence one revolution of the pedestal shaft 650. The Geneva driver 648 has a driving pin 652 and a locking cam 654, which cooperate in a conventional manner with a Geneva star wheel 656 fixed on a rotatable shaft 658. The Geneva driver 648 produces intermittently for each revolution thereof a one-fourth revolution of the Geneva star wheel 656, hence a one-fourth revolution on the shaft 658 on which the star wheel is fixed. Fixed on this shaft 658 is a large transmission gear 660, which meshes with the gate sprocket wheel drive gear 600 in an appropriate ratio such that one-fourth revolution of the transmission gear 660 produces one and one-twelfth revolutions of the gate sprocket drive gear 600, thereby turning the gate sprocket 596 through 390° to move a new unexposed film strip portion into the gate. This occurs intermittently, every second revolution of the power input shaft; hence occurs intermittently once during each alternate revolution of the optical system in the camera.

Fixed on the pedestal shaft 650 at a position beneath the Geneva driver 648 is a transmission gear 662, which drives a similar transmission gear 664 fixed on a rotatable shaft 666. The transmission gear 664 in turn drives a similar transmission gear 668 fixed on a rotatable shaft 670. The gear ratio between these three transmission gears is 1:1 in each instance. Thus, two revolutions of the power input shaft 642 produces one revolution of each of the transmission gears 662, 664, 668 in the direction indicated by the arrows.

Fixed to the rotatable shafts 666, 670 at positions above the respective transmission gears 664, 668 are a pair of substantially identical Geneva drivers 672, 674 respectively. The first of these Geneva drivers 672 has a driving pin 676 and a pair of locking cams 678, 680. The other Geneva driver 674 is similar, and has a driving pin 684 and a pair of locking cams 686, 688. Between the two Geneva drivers 672 and 674 and fixed on a rotatable stub shaft 690 is a Geneva star wheel 692 having across the bottom face thereof a single driving pin channel 694 and having four evenly spaced curved depressions similar to the one shown typically at 696 for cooperating with the locking cams of the two Geneva drivers. By inspection it will be seen that as the Geneva drivers both rotate, the star wheel 692 will be toggled back and forth first in one direction then in the other moving its stub shaft 690 accordingly. More specifically, for each two revolutions of the power input shaft 642, hence for each two revolutions of the optical system, there will be produced a one-fourth revolution of the Geneva star wheel 692 first in one direction and then in the other direction, by virtue of alternate engagement of the channel 694 with the driving pins of the Geneva drivers 672, 674. The Geneva drivers are out of phase as illustrated and each turns through one revolution for each two revolutions of the power input shaft 642 and optical system. Fixed on the same rotatable stub shaft 690 as the Geneva star wheel 692 is a gear 698, which meshes with the gear 606 that drives the film guide rollers 570, 572 and the outer light shield 576 back and forth about the vertical axis.

A transmission gear 682 fixed on the rotatable shaft 666 drives in 1:1 ratio a gear 700 which is keyed to the central shaft 594 that carries the inner light shield 574 at its upper end. For each two revolutions of the power input shaft 642, hence the optical system, there is produced a single continuous revolution of the central shaft 594, hence a single continuous revolution of the inner light shield 574.

A transmission gear 702 is keyed to the central shaft 594 beneath the driving gear 700, and drives in 2:1 ratio a transmission gear 704 fixed on a rotatable shaft 706 (FIG. 29). Shaft 706 in turn rotates a gear 708 also fixed thereto, which meshes with each of two gears 710, 712 fixed on rotatable shafts 714, 716 respectively. Gears 710 and 712 are similar. Fixed atop the shafts 714, 716 respectively is the film take-up sprocket 590 and film supply sprocket 586. The transmission gear 702, which makes one continuous revolution for each two revolutions of the power input shaft and optical system, produces two continuous revolutions of the gear 704 hence of the shaft 706. This in turn produces two continuous revolutions of the transmission gear 708. Hence the gear 708 makes one continuous revolution for each revolution of the power input shaft and of the optical system. Each revolution of gear 708 produces one and one-twelfth revolutions of gears 710 and 712 in opposite directions, by appropriate gear ratio. This produces one and one-twelfth revolutions of the supply and take-up sprockets for each revolution of the optical system. This is the required amount of rotation of the take-up and supply sprockets to maintain the film loops 568A, 568B (FIG. 25), since the diameter of each of these sprockets is one-half that of the gate sprocket wheel.

I claim:

1. In a camera for photographing panoramic pictures, the combintaion which comprises an upper reflector supported in an inclined position on and ratatable about a vertical axis for intercepting light from the lateral surroundings and reflecting the same downwardly, a lower reflector supported in an inclined position on and rotatable about the same vertical axis for intercepting the reflected light beam from the upper reflector and reflecting the same in a lateral direction, means defining a curved film gate on a radius about said vertical axis outwardly from said lower reflector for supporting a film strip portion in position to receive light reflected laterally by said lower reflector, a lens system supported in alignment with the light path in the camera and having its focal plane located outwardly from the lower reflector at approximately the same distance from the vertical axis as the film gate the vertical optical axis of the lens system coinciding with the rotational axis of the reflectors, means for continuously rotating said reflectors in unison about said vertical axis so as to repeatedly pan a wide field of view across the full horizontal extent of the film gate, said lens system having its second principal point disposed substantially at the surface of the lower reflector which causes images of still objects to stand still in the focal plane as the reflectors rotate, and means synchronized with the rotation of said reflectors for introducing successive unexposed film strip portions to said film gate after each preceding one is exposed, whereby successive panoramic picture frames are produced.

2. Apparatus of claim 1 wherein the second principal point of the lens system is disposed at the reflecting surface of the lower reflector, and wherein the effective focal length of the lens system is equal to the radius of the film gate, the lens system being focused for objects effectively at infinity.

3. Apparatus of claim 1 wherein the lens system includes a negative lens having a relatively long focal length and a positive lens having a relatively short focal length, said lenses being supported between the upper and lower reflectors on a common optical axis which coincides with said vertical axis, with the negative lens disposed above the positive lens.

4. Apparatus of claim 1 wherein the lens system includes lenses supported between the upper and lower reflectors on a common optical axis which coincides with the vertical axis, and wherein the means for rotating said reflectors in unison includes a sleeve support, means mounting the reflectors and lenses coaxially on the sleeve support, means rotatably mounting said sleeve support coaxially on the vertical axis, and means for rotating the sleeve support about said axis.

5. Apparatus of claim 4 wherein the means mounting the lower reflector on the sleeve support comprises an enclosure depending axially from the sleeve support and disposed centrally within the curved film gate, said enclosure having a side opening therein, the horizontal angular width of the opening as measured about the vertical axis being substantially less than the extent of the film gate, and means mounting the lower reflector in said enclosure in optical alignment with said opening.

6. Apparatus of claim 4 wherein the means rotatably mounting said sleeve support comprises an outer sleeve, bearing means rotatably mounting said outer sleeve on said vertical axis, and means for detachably mounting the sleeve support in said outer sleeve.

7. Apparatus of claim 1 wherein the means for rotating the reflectors in unison includes a support disposed above the film gate and rotatably mounted coaxially on the vertical axis and means mounting the reflectors on the support including means depending axially from the support and disposed centrally within the curved film gate for suspending the lower reflector from above centrally within the film gate, and wherein the means for introducing successive unexposed film strip portions includes a sprocket wheel for engaging the film strip, means disposed below the film gate for rotatably supporting the sprocket wheel coaxially on said vertical axis at a position immediately below the lower reflector so that the sprocket wheel engages the film strip portion in the gate, the effective root radius of the sprocket wheel being equal to the radius of the gate, and means synchronized with the rotation of the reflectors for driving said sprocket wheel.

8. In a camera for photographing panoramic pictures, the combination which comprises a watertight housing including an upper transparent portion curved about a vertical axis, an upper reflector supported in said housing adjacent said transparent portion in an inclined position on and rotatable about said vertical axis for intercepting light from the lateral surroundings through said transparent portion and reflecting the same downwardly, a lower reflector supported in said housing in an inclined position on and rotatable about the same vertical axis for intercepting the reflected light from the upper reflector and reflecting the same in a lateral direction, means defining a curved film gate centered about said vertical axis in said housing outwardly of said lower reflector for supporting a film strip portion in position to receive light reflected laterally by said lower reflector, a lens system supported in said housing in alignment with the light path and having its focal plane located outwardly from the lower reflector at the same distance from the vertical axis as the film gate the vertical optical axis of the lens system coinciding with the rotational axis of the reflectors, the lens system having its second principal point substantially at the surface of the lower reflector, said lens system including lens means for compensating for image distortion introduced by the curved nature of said transparent housing portion in underwater environments so as to preserve the orientation of the second principal point closely adjacent the lower reflector surface, means mounted within the housing for rotating said reflectors in unison about said vertical axis so as to repeatedly pan a wide field of view across the full horizontal extent of the film gate, and means mounted within the housing and synchronized with the rotation of said reflectors for introducing successive unexposed film strip portions to said film gate after each preceding one is exposed, whereby successive panoramic picture frames may be produced in an underwater environment.

9. Apparatus of claim 8 wherein said transparent portion is cylindrically curved about the vertical axis.

10. In a camera for photographing panoramic pictures, the combination which comprises an upper reflector supported in an inclined position on and rotatable about a vertical axis for intercepting light from the lateral surroundings and reflecting the same downwardly, a lower reflector supported in an inclined position on and rotatable about the same vertical axis for intercepting the reflected light beam from the upper reflector and reflecting the same in a lateral direction, means defining a curved film gate centered about said vertical axis outwardly of the lower reflector for supporting a film strip portion in position to receive light reflected laterally by said lower reflector, a lens system supported in alignment with the light path and having its focal plane located outward from the lower reflector at approximately the same distance from the vertical axis as the film gate the vertical optical axis of the lens system coinciding with the rotational axis of the reflectors, the lens system having its second principal point substantially at the surface of the lower reflector, means for focusing the lens system for different object distances while maintaining said focal plane and said second principal point locations substantially constant, means for continuously rotating said reflectors in unison about said vertical axis so as to repeatedly pan a wide field of view across the full horizontal extent of the film gate, and means synchronized with the rotation of said reflectors for introducing successive unexposed film strip portions to said film gate after each preceding one is exposed, whereby successive panoramic picture frames are produced.

11. In a motion picture camera for photographing panoramic pictures, the combination which comprises an upper reflector supported in an inclined position on a vertical axis for intercepting light from the lateral surroundings and reflecting the same downwardly, a lower reflector supported in an inclined position on the same vertical axis for intercepting the reflected light from the upper reflector and reflecting the same in a lateral direction, means defining a curved film gate centered about said vertical axis outwardly of said lower reflector for supporting a film strip portion in position to receive light reflected laterally by said lower reflector, a lens system supported in alignment with the light path in the camera and having its focal plane located outward from the lower reflector at approximately the same distance from the vertical axis as the film gate and having its second principal point located substantially at the reflecting surface of the lower reflector, said lens system including a plurality of lenses supported between the upper and lower reflectors on a common optical axis which coincides with said vertical axis, means for supporting said reflectors and lenses for rotation in unison about said vertical axis, said supporting means including means for focusing the lens system for different object distances and the focusing means including means for adjusting the vertical position of said lenses on the vertical axis in accordance with a predetermined relationship which maintains said focal plane and said second principal point locations substantially constant and maintains images of still objects at rest in said focal plane when said reflectors and lenses rotate, means for continuously rotating the supporting means about said vertical axis so as to repeatedly pan a wide field of view around the full horizontal extent of the film gate, and means synchronized with the rotation of said supporitng means for introducing successive unexposed film portions to said film gate after each preceding one is exposed, whereby successive panoramic motion picture frames are produced.

12. Apparatus of claim 11 wherein the supporting means comprises an outer sleeve rotatably mounted on the vertical axis, an inner sleeve mounted rotatably in the outer sleeve, upper and lower lens housings, and means mounting the upper and lower lens housings in the inner sleeve, said last named means including cam means for moving the upper and lower lens housings along the vertical axis according to predetermined rates and directions responsive to rotation of the inner sleeve relative to the outer sleeve.

13. Apparatus of claim 11 wherein the supporting means comprises an outer sleeve rotatably mounted on the vertical axis, an inner sleeve mounted inside the outer sleeve and rotatable with respect thereto, the inner sleeve having upper and lower internally threaded portions, upper and lower lens housings mounted inside the inner sleeve, said upper and lower lens housings being exteriorly threaded and mating respectively with the upper and lower threaded portions of the inner sleeve, and means for restricting movement of the lens housings relative to the outer sleeve to longitudinal movement along the vertical axis, whereby rotation of the inner sleeve relative to the outer sleeve adjusts the vertical position of the upper and lower lens housings simultaneously in accordance with the direction and rates of the respective upper and lower sets of threads.

14. Apparatus of claim 13 wherein the upper lens housing carries a negative lens having a relatively long focal length, wherein the lower lens housing carries a positive lens having a relatively short focal length, wherein the second principal point of the lens system lies beneath the positive lens and at a position adjacent the lower reflector which causes images of still objects to remain at rest in the focal plane, and wherein said upper and lower threads have predetermined rates and directions which maintain the focal plane location constant and maintain the second principal point of the lens system at a position adjacent the lower reflector which causes images of still objects to remain at rest in the focal plane as the inner sleeve is rotated relative to the outer sleeve to focus the lens system for different object distances.

15. In a motion picture camera for photographing panoramic pictures, the combination which comprises an upper reflector supported in an inclined position on and rotatable about a vetrical axis for intercepting light from the lateral surroundings and reflecting the same downwardly, a lower reflector supported in an inclined position on and rotatable about the same vertical axis for intercepting the reflected light from the upper reflector and reflecting the same in a lateral direction, means defining a curved film gate on a radius about said vertical axis at a position outwardly of said lower reflector for supporting a film strip portion in position to receive light reflected laterally by said lower reflector, a lens system supported in alignment with the light path in the camera and having its focal plane located outward from the lower reflector at approximately the same radius from the vertical axis as the film gate, the vertical optical axis of the lens system coinciding with the rotational axis of the reflectors, means for rotating said reflectors in unison about said vertical axis so as to repeatedly pan a wide field of view around the full horizontal extent of the film gate, and means synchronized with the rotation of said reflectors for introducing successive unexposed film portions to said film gate after each preceding one is exposed whereby successive panoramic motion picture frames are produced, said last named means including means for periodically shielding the light from the film area in the gate as the reflectors rotate, and film advancing means synchronized with the rotation of the reflectors for introducing successive unexposed film strip portions into the film gate concurrent with the periods when said light is shielded.

16. In a motion picture camera for photographing panoramic pictures, the combination which comprises an upper reflector supported in an inclined position on and rotatable about a vertical axis for intercepting light from the lateral surroundings and reflecting the same downwardly, a lower reflector supported in an inclined position on and rotatable about the same vertical axis for intercepting the reflected light from the upper reflector and reflecting the same in a lateral direction, means defining a curved film gate on a radius about said vertical axis at a position outwardly of said lower reflector for supporting a film strip portion in position to receive light reflected laterally by said lower reflector, a lens system supported in alignment with the light path in the camera and having its focal plane located outward from the lower reflector at approximately the same radius from the vertical axis as the film gate, the vertical optical axis of the lens system coinciding with the rotational axis of the reflectors, means for rotating said reflectors in unison about said vertical axis so as to repeatedly pan a wide field of view around the full horizontal extent of the film gate, and means synchronized with the rotation of said reflectors for introducing successive unexposed film portions to said film gate after each preceding one is exposed whereby successive panoramic motion picture frames are produced, said last named means including means for periodically shielding the light from the film area in the gate as the reflectors rotate, and film advancing means synchronized with the rotation of the reflectors for introducing successive unexposed film strip portions into the film gate concurrent with the periods when said light is shielded, the film advancing means including a sprocket wheel supported coaxially on said vertical axis at a position immediately below the lower reflector for engaging the film strip portion in the gate, the effective root radius of the sprocket wheel being equal to the radius of the gate, and means synchronized with the rotation of the reflectors for driving said sprocket wheel intermittently at periods corresponding to the periodic shielding of said light.

17. In a motion picture camera for photographing panoramic pictures, the combination which comprises an upper reflector supported in an inclined position on and rotatable about a vetrical axis for intercepting light from the lateral surroundings and reflecting the same downwardly, a lower reflector supported in an inclined position on and rotatable about the same vertical axis for intercepting the reflected light from the upper reflector and reflecting the same in a lateral direction, means defining a curved film gate on a radius about said vertical axis at a position outwardly of said lower reflector for supporting a film strip portion in position to receive light reflected laterally by said lower reflector, a lens system supported in alignment with the light path in the camera and having its focal plane located outward from the lower reflector at approximately the same radius from the vertical axis as the film gate the vertical optical axis of the lens system coinciding with the rotational axis of the reflectors, means for rotating said reflectors in unison about said vertical axis so as to repeatedly pan a wide field of view around the full horizontal extent of the film gate, and means synchronized with the rotation of said reflectors for introducing successive unexposed film portions to said film gate after each preceding one is exposed whereby successive panoramic motion picture frames are produced, said last named means including a framing member having a wall of approximate cylindrical curvature about said axis and disposed at the inner side of the film gate, said framing member having a slot aperture extending around a substantial portion of said wall for exposing a single picture frame area to the lower reflector, and film advancing means synchronized with the rotation of said reflectors for introducing successive unexposed film strip portions into registry with said framing aperture concurrent with periods when the lower reflector is not registered with said framing aperture.

18. Apparatus of claim 17 wherein the framing aperture extends around the framing member for at least about 180°, and wherein the film advancing means includes a sprocket wheel supported coaxially on said vertical axis at a position immediately below the lower reflector for engaging the film strip portion in the gate, the root radius of the sprocket wheel being equal to the radius of the gate, and means synchronized with the rotation of the reflectors for driving said sprocket wheel intermittently at periods corresponding to the periodic shielding of said light.

19. In a motion picture camera for photographing panoramic pictures, the combination which comprises an upper reflector in the form of a relatively large reflecting prism supported on a vertical axis with its reflecting surface inclined on the axis for intercepting light from the lateral surroundings and reflecting the same downwardly; a lower reflector in the form of a relatively small first surface mirror supported in an inclined position on the same vertical axis at a location beneath the prism for intercepting the reflected light from the prism and reflecting the same in a lateral direction; the reflecting surfaces of the mirror and prism being parallel along at least one horizontal direction; means defining a cylindrically curved film gate on a radius about said vertical axis outwardly of said lower reflector for supporting a film strip portion in position to receive light reflected laterally by said lower reflector; a lens system supported in alignment with the light path in the camera and having its focal plane located outward from the lower reflector at approximately the same radius from the vertical axis as the film gate, said lens system including a plurality of lenses supported between the upper and lower reflectors on a common optical axis which coincides with said vertical axis; means for supporting the reflectors and lenses for rotation in unison about said vertical axis, said supporting means including a sleeve support, means mounting the reflectors and lenses coaxially on said sleeve support, and means rotatably mounting the sleeve support axially on the vertical axis, the means mounting the lower reflector on the sleeve support including an enclosure depending axially from the sleeve support and disposed centrally within the curved film gate, said enclosure having a side opening therein, the horizontal angular width of the opening as measured about the vertical axis being only a small fractional part of 180°, and means mounting the lower reflector in said enclosure in optical alignment with said opening; means for rotating the sleeve support about the vertical axis so as to repeatedly pan a wide field of view around the full extent of the film gate; and means synchronized with the rotation of said sleeve support for introducing successive unexposed film portions to said film gate after each preceding one is exposed whereby successive panoramic motion picture frames are produced; said last named means including a framing member having a wall of approximate cylindrical curvature about said axis and disposed at the inner side of the film gate, said framing member having a framing aperture extending for at least about 180° around its wall for exposing a single picture frame area to the lower reflector, and film advancing means synchronized with the rotation of said sleeve support for introducing successive unexposed film strip portions into registry with the framing aperture concurrent with periods when the lower reflector is out of alignment with the framing aperture; the film advancing means including a sprocket wheel supported coaxially on said vertical axis at a position immediately below the lower reflector for engaging the film strip portion in the gate, the root radius of the sprocket wheel being equal to the radius of the gate, and means synchronized with the rotation of the sleeve support for driving said sprocket wheel intermittently at periods corresponding to the periods when the lower reflector is out of alignment with said framing aperture.

20. Apparatus of claim 19 wherein the second principal point of the lens system is at the surface of the lower reflector and wherein the effective focal length of the lens system is equal to the radius of the film gate, the lens system being focused for objects effectively at infinity.

21. Apparatus of claim 19 wherein the means rotatably mounting the sleeve support on the vertical axis includes an outer sleeve, means rotatably mounting the outer sleeve on the vertical axis, and means mounting the sleeve support coaxially in the outer sleeve so that the angular position of the sleeve support in the outer sleeve is adjustable; wherein the sleeve support has upper and lower internally threaded portions; wherein the means mounting the lenses on the sleeve support includes an upper lens housing, a lower lens housing, the upper and lower lens housings being exteriorly threaded and mating respectively with the upper and lower threaded portions of the sleeve support, and means for restricting movement of the lens housings relative to the outer sleeve to longitudinal movement along the vertical axis, whereby adjustment of the angular position of the sleeve support within the outer sleeve focuses the camera for chosen object distances by adjusting the vertical position of the upper and lower lens housings simultaneously in accordance with the direction and rates of the respective upper and lower threads in the sleeve support; and, wherein the means for rotating the sleeve support to repeatedly pan a wide field of view around the film gate comprises means for rotating the outer sleeve about said vertical axis.

22. Apparatus of claim 21 wherein the means adjustably mounting the support sleeve in the outer sleeve comprises an intermediate sleeve detachably secured in the outer sleeve, and means mounting the support sleeve coaxially in the intermediate sleeve so that the angular posititon of the support sleeve is adjustable therein.

23. In a motion picture camera for photographing panoramic pictures, the combination which comprises an upper reflector supported in an inclined position on and rotatable about a vertical axis for intercepting light from the lateral surroundings and reflecting the same downwardly, a lower reflector supported in an inclined position on and rotatable about the same vertical axis for intercepting the reflected light from the upper reflector and reflecting the same in a lateral direction, means defining a substantially cylindrical film gate on a radius about said vertical axis at a position outwardly of said lower reflector for supporting at least substantially a full circle of film strip in position to receive light reflected laterally by said lower reflector, a lens system supported in alignment with the light path in the camera and having its focal plane located outward from the lower reflector at approximately the same radius from the vertical axis as the film gate, the vertical optical axis of the lens system coinciding with the rotational axis of the reflectors, means for rotating said reflectors in unison about said vertical axis so as to repeatedly pan a 360° field of view around the film gate, and means synchronized with the rotation of said reflectors for introducing successive unexposed film strip portions to said film gate after each preceding one is exposed whereby successive panoramic motion picture frames are produced, said last named means including means for shielding the light from the film gate during at least a substantial portion of each alternate revolution of the reflectors, and film advancing means for introducing successive unexposed film strip portions into the film gate concurrent with the periods when said light is shielded.

24. Apparatus of claim 23 wherein the shielding means comprises an inner and an outer light shield disposed between the vertical axis and the film gate, means for rotating the inner light shield about the vertical axis at half the speed of the reflector rotation and in the same direction, and means for intermittently moving the outer light shield around the vertical axis between first and second rest positions, the angular extent and phasing of the light shields about the vertical axis being predetermined so that the outer shield determines the beginning and end of each frame when at its first and second rest positions respectively.

25. Apparatus of claim 23 wherein the film advancing means includes a sprocket wheel supported coaxially on said vertical axis at a position immediately below the lower reflector for engaging the film strip portion in the gate, the root radius of the sprocket wheel being equal to the radius of the gate, and means for driving the sprocket wheel through at least about 360° around the vertical axis during each period when the light is shielded.

26. In a motion picture camera for photographing panoramic pictures, the combination which comprises an upper reflector supported in an inclined position on a vertical axis for intercepting light from the lateral surroundings and reflecting the same downwardly, a lower reflector supported in an inclined position on the same vertical axis for intercepting the reflected light from the upper reflector and reflecting the same in a lateral direction, means defining a substantially cylindrical film gate on a radius about said vertical axis at a position outwardly of said lower reflector for supporting at least substantially a full circle of film strip in position to receive light reflected laterally by said lower reflector, a lens system supported in alignment with the light path in the camera and having its focal plane located outward from the lower reflector at approximately the same radius from the vertical axis as the film gate, means for rotating said reflectors in unison about said vertical axis so as to repeatedly pan a 360° field of view around the film gate, and means synchronized with the rotation of said reflectors for introducing successive unexposed film strip portions to said film gate after each preceding one is exposed whereby successive panoramic motion picture frames are produced, said last named means including means for shielding the light from the film gate during at least a substantial portion of each alternate revolution of the reflectors, film advancing means for introducing successive unexposed film strip portions into the film gate concurrent with the periods when said light is shielded, and film guide means for unwrapping an exposed film portion from the gate and wrapping an unexposed film portion onto the gate during each frame exposure period, whereby each frame includes an exposure of at least 360°.

27. In a motion picture camera for photographing panoramic pictures, the combination which comprises an upper reflector supported in an inclined position on a vertical axis for intercepting light from the lateral surroundings and reflecting the same downwardly, a lower reflector supported in an inclined position on the same vertical axis for intercepting the reflected light from the upper reflector and reflecting the same in a lateral direction, means defining a substantially cylindrical film gate on a radius about said vertical axis at a position outwardly of said lower reflector for supporting at least substantially a full circle of film strip in position to receive light reflected laterally by said lower reflector, a lens system supported in alignment with the light path in the camera and having its focal plane located outward from the lower reflector at approximately the same radius from the vertical axis as the film gate, means for rotating said reflectors in unison about said vertical axis so as to repeatedly pan a 360° field of view around the film gate, and means synchronized with the rotation of said reflectors for introducing successive unexposed film srtip portions to said film gate after each preceding one is exposed whereby successive panoramic motion picture frames are produced, said last named means including means for shielding the light from the film gate during at least a substantial portion of each alternate revolution of the reflectors, film advancing means for introducing successive unexposed film strip portions into the film gate concurrent with the periods when said light is shielded, a pair of film guide members disposed vertically side by side adjacent the exterior of the cylindrical film gate and between which the film passes to extend around the gate, and means for moving the film guide members a predetermined angular distance about the vertical axis in the same direction as the reflector rotation when a predetermined amount of each frame is exposed and for moving the guide members back to their original position during each period when the light is shielded, whereby an exposed portion of each frame is unwrapped from and an unexposed portion is wrapped onto the film gate during each frame exposure period so as to extend the length of each frame to at least 360°.

28. Apparatus of claim 27 wherein the film advancing means includes a sprocket wheel supported coaxially on the vertical axis at a position immediately below the lower reflector for engaging the film strip portion in the gate, the root radius of the sprocket wheel being equal to the radius of the gate, and means for driving the sprocket wheel through at least 360° about the vertical axis during each period when the light is shielded; wherein the film guide members are substantially cylindrical with their axes parallel to the vertical axis; wherein the means for moving the film guide members about the vertical axis comprises a film guide support rotatable about said vertical axis, means mounting the film guide members on the film guide support so that each film guide member is rotatable about its own vertical axis on the support, means for moving the film guide support about the vertical axis, and means engaging the film guide members with the sprocket wheel so that relative movement between the axes of the film guide members and the sprocket wheel around the vertical axis produces rotation of the film guide members on their axes.

29. Apparatus of claim 28 wherein the shielding means comprises an inner and an outer light shield disposed within the film gate, the outer shield being coupled to the film guide support at a position opposite the film guide members for movement about the vertical axis therewith, and means for rotating the inner light shield about the vertical axis at half the speed of the reflector rotation and in the same direction, the angular extent and phasing of the light shields about the vertical axis being predetermined so that the outer shield extends past the inner shield by an angular distance of at least A both at the beginning and end of each frame so as to determine the incidence of light on the frame at the beginning and end thereof, where A is the angular extent of the light beam from the lower reflector taken about the vertical axis.

30. In a motion picture camera for photographing panoramic pictures, the combination which comprises an upper reflector in the form of a relatively large reflecting prism supported on a vertical axis with its reflecting surface inclined on the axis for intercepting light from the lateral surroundings and reflecting the same downwardly; a lower reflector in the form of a relatively small first surface mirror supported in an inclined position on the same vertical axis at a location beneath the prism for intercepting the reflected light from the prism and reflecting the same in a lateral direction; the reflecting surfaces of the mirror and prism being parallel along at least one horizontal direction, means defining a substantially cylindrical film gate on a radius about said vertical axis outwardly of said lower reflector for supporting at least substantially a full circle of film strip in position to receive light reflected laterally by said lower reflector, a lens system supported in alignment with the light path in the camera and having its focal plane located outward from the lower reflector at approximately the same radius from the vertical axis as the film gate, said lens system including a plurality of lenses supported between the upper and lower reflectors on a common optical axis which coincides with said vertical axis; means for supporting the reflectors and lenses for rotation in unison about said vertical axis, said supporting means including a sleeve support, means mounting the reflectors and lenses coaxially on said sleeve support, and means rotatably mounting the sleeve support axially on the vertical axis; the means mounting the lower reflector on the sleeve support including an enclosure depending axially from the sleeve support and disposed centrally within the cylindrical film gate, said enclosure having a side opening therein, the horizontal angular width of the opening as measured about the vertical axis being only a small fractional part of 180°, and means mounting the lower reflector in said enclosure in optical alignment with said opening; means for rotating the sleeve support about the vertical axis so as to repeatedly pan a 360° field of view around the film gate; and, means synchronized with the rotation of said reflectors for introducing successive unexposed film portions to said film gate after each preceding one is exposed whereby successive panoramic motion picture frames are produced, said last named means comprising means for shielding the light from the film gate for substantially less than 360° of each alternate revolution of the reflectors, film advancing means for introducing successive unexposed film strip portions into the film gate concurrent with the periods when said light is shielded, a pair of film guide members disposed vertically side by side adjacent the exterior of the cylindrical film gate and between which the film passes to extend around the gate, and means for moving the film guide members a predetermined angular distance about the vertical axis in the same direction as the reflector rotation when a predetermined amount of each frame is exposed and for moving the guide members back to their original position during each period when the light is shielded, said predetermined angular distance being sufficient to wrap an unexposed film portion about the film gate to a position substantially beyond the beginning of the frame, whereby each frame includes an exposure substantially in excess of 360°.

31. In a camera for photographing panoramic pictures, the combination which comprises an upper reflector supported in an inclined position on and rotatable about a vertical axis for intercepting light from the lateral surroundings and reflecting the same downwardly, a lower reflector supported in an inclined position on and rotatable about the same vertical axis for intercepting the reflected light beam from the upper reflector and reflecting the same in a lateral direction, means defining a curved exposure gate on a radius about said vertical axis outwardly of said lower reflector, a lens system supported in alignment with the light path in the camera and having its focal plane located outwardly from the lower reflector at approximately the same distance from the vertical axis as the exposure gate the vertical optical axis of the lens system coinciding with the rotational axis of the reflectors, means for continuously rotating said reflectors in unison about said vertical axis so as to repeatedly pan a wide field of view across the full horizontal extent of the exposure gate, said lens system having its second principal point substantially at the reflecting surface of the lower reflector which causes images of still objects to stand still in the focal plane as the reflectors rotate, means supporting a photosensitive medium in said exposure gate and means synchronized with the rotation of said reflectors for opening said exposure gate to said photosensitive medium at such a frequency that successive panoramic picture frames are produced.

References Cited by the Examiner

UNITED STATES PATENTS

| 866,257 | 9/07 | Case | 95—16 |
|---|---|---|---|
| 2,001,683 | 5/35 | Jackman | 352—242 |
| 2,794,379 | 6/57 | McNeil | 95—16 |
| 2,863,713 | 12/58 | Mito | 95—16 |
| 2,966,096 | 12/60 | D'Incerti | 352—69 |
| 3,059,528 | 10/62 | Allan | 352—69 |
| 3,077,816 | 2/63 | Hirsch | 352—119 X |
| 3,078,758 | 2/63 | Caldwell et al. | 352—69 |

FOREIGN PATENTS

| 1,040,064 | 5/53 | France. |
|---|---|---|

NORTON ANSHER, *Primary Examiner.*

EMIL G. ANDERSON, EVON C. BLUNK, *Examiners.*

UNITED STATES PATENT OFFICE
CERTIFICATE OF CORRECTION

Patent No. 3,214,232                      October 26, 1965

Reginald G. Spear

It is hereby certified that error appears in the above numbered patent requiring correction and that the said Letters Patent should read as corrected below.

Column 1, line 20, strike out "so"; column 2, line 52, for "postion" read -- position --; column 4, line 38, insert a period after "40"; line 47, for "lever" read -- level --; column 5, line 3, for "surfaces" read -- surface --; line 29, for "coller" read -- collar --; column 7, line 52, for "lower" read -- lever --; column 11, in the table, last column, line 3 thereof, for "87,44" read -- 87.44 --; column 18, line 35, strike out "A gate sprocket wheel 596 is formed as an" and insert instead -- Bearing mounted on the exterior of the sleeve --; column 20, line 17, before "shaft" insert -- same --; column 21, line 31, for "ratatable" read -- rotatable --.

Signed and sealed this 2nd day of August 1966.

(SEAL)
Attest:

ERNEST W. SWIDER                      EDWARD J. BRENNER
Attesting Officer                 Commissioner of Patents